United States Patent
Nakayama

(10) Patent No.: US 9,132,555 B2
(45) Date of Patent: Sep. 15, 2015

(54) ROBOT GRIPPING DEVICE

(71) Applicant: FANUC CORPORATION, Yamanashi (JP)

(72) Inventor: Kazutaka Nakayama, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/340,057

(22) Filed: Jul. 24, 2014

(65) Prior Publication Data

US 2015/0028613 A1 Jan. 29, 2015

(30) Foreign Application Priority Data

Jul. 26, 2013 (JP) .................................. 2013-156109
Dec. 5, 2013 (JP) .................................. 2013-251990

(51) Int. Cl.
B25B 9/00 (2006.01)
B66C 1/00 (2006.01)
B25J 15/02 (2006.01)
B25J 15/12 (2006.01)

(52) U.S. Cl.
CPC .............. *B25J 15/0206* (2013.01); *B25J 15/12* (2013.01)

(58) Field of Classification Search
CPC .......... B25B 9/00; B25J 1/04; B25J 15/0206; B25J 15/12; E01H 2001/1293; E21B 31/18; A01B 1/18; A01D 46/247; A01D 46/24; A01D 51/002; A01D 51/00; A01D 46/005
See application file for complete search history.

(56) References Cited

U.S. PATENT DOCUMENTS

| 3,527,492 | A | | 9/1970 | Hollis | |
|---|---|---|---|---|---|
| 4,962,957 | A | * | 10/1990 | Traber | 294/100 |
| 5,577,785 | A | * | 11/1996 | Traber et al. | 294/100 |
| 6,257,634 | B1 | * | 7/2001 | Wei | 294/111 |
| 6,874,833 | B2 | * | 4/2005 | Keith et al. | 294/209 |
| 2007/0241573 | A1 | | 10/2007 | Teng | |
| 2008/0224488 | A1 | * | 9/2008 | Khubani | 294/19.1 |

FOREIGN PATENT DOCUMENTS

| DE | 102012011095 A1 | 7/2013 |
|---|---|---|
| EP | 2502714 A1 | 9/2012 |
| JP | 63-126347 | 8/1988 |
| JP | 07-277535 | 10/1995 |
| JP | 2002-154075 | 5/2002 |
| JP | 2011-245566 | 12/2011 |

* cited by examiner

*Primary Examiner* — Stephen Vu

(57) ABSTRACT

A robot gripping device (60) where each finger part has a finger part body (1) which is comprised of a plate-shaped elastic member, a first anti-slip part (2) which is provided at an inside of a front end side of the finger part body, and a reinforcing member (20) which is arranged along an outer surface of the finger part body, is connected to the front end of the finger part body, and is higher in rigidity than the finger part body, the reinforcing member having a first rotary joint (4) which makes the reinforcing member pivot about a first axis of rotation which is vertical to a longitudinal direction of the finger part body, and the robot gripping device having a drive part (62) which makes a base end of the finger part body move along the center of grip to make the finger part open and close.

15 Claims, 31 Drawing Sheets

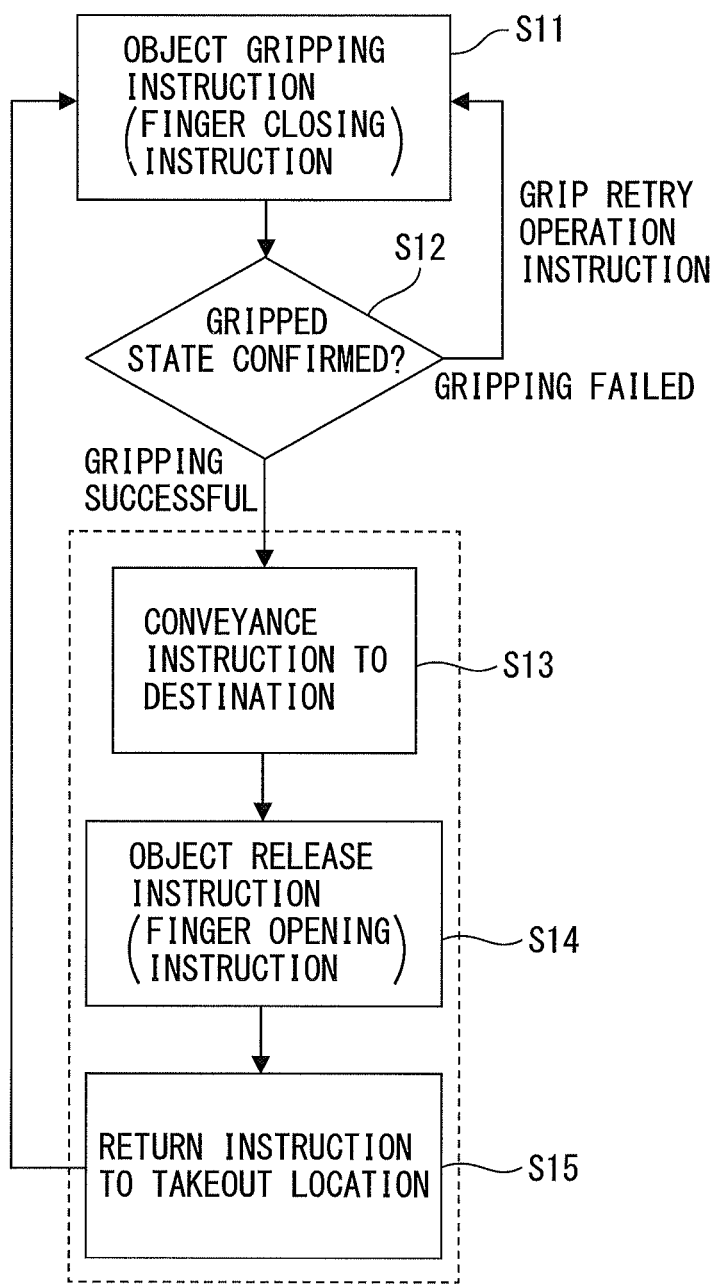

ROBOT GRIPPING DEVICE

BACKGROUND OF THE INVENTION

1. Field of the Invention

The present invention relates to a robot gripping device which grips a workpiece which may be of various shapes and may be arranged in various orientations.

2. Description of the Related Art

The front end of a wrist of a robot is provided with a gripping device for gripping a workpiece. FIG. 10A and FIG. 10B are a top view and a side view of a first hand in the related art. FIG. 10A and FIG. 10B show a servo hand which is attached to a robot. Such a servo hand has a structure similar to a human hand and is advantageous for gripping various shapes and various orientations of workpieces However, the servo hand which is shown in FIG. 10A and FIG. 10B has a plurality of servo motors and a complicated link mechanism built into it. Therefore, such a servo hand is extremely expensive and requires fine, complicated control. For this reason, at the present, the spread of such servo hands has been slow.

Further, FIG. 11 is a view which shows a second hand in the related art. A chuck which is shown in FIG. 11 is provided with two or three finger parts. However, the chuck which is shown in FIG. 11 usually has no versatility and can only grip predetermined shapes of workpieces. When gripping a complicated shape of workpiece, the workpiece had to be arranged in a limited, specific orientation.

Furthermore, Japanese Patent Publication No. 2011-245566A discloses a gripping device which uses bent plate-shaped members to open and close a gripping part. U.S. Pat. No. 3,527,492 discloses a gripping device where a finger part is comprised of an outside spring finger and an inside flexible finger.

However, the gripping device of Japanese Patent Publication No. 2011-245566A cannot open the finger parts wide, so can only grip small sized workpieces. Further, there was the problem that the drive part of the gripping device was considerably large compared with the gripping part.

Furthermore, the spring finger and flexible finger of U.S. Pat. No. 3,527,492 are made of plate springs with low rigidity. Therefore, the gripping device of U.S. Pat. No. 3,527,492 can only grip a light weight workpiece. Further, when gripping, a large force is required for bending the outside spring finger, so the gripping device of U.S. Pat. No. 3,527,492 is low in drive efficiency. Furthermore, the outside spring finger bends outward at the time of gripping, so there is the problem that the spring finger easily contacts nearby objects.

In this regard, a gripping device which is attached to a front end of a wrist of a robot is also used when taking out workpieces which are randomly stacked in a holding box. In such a case, high a gripping precision is not required in the sense of the relative positional relationship between the hand and the workpiece when the hand of the gripping device grips a workpiece. Even if the gripping precision is low, for example, if the hand roughly grabs a part, it is sufficient that the hand can reliably grip the workpiece and take it outside of the holding box.

However, in the gripping device such as shown in FIG. 10 or FIG. 11, it is only possible to grip a workpiece which is arranged at a predetermined orientation. Further, to keep the gripping device from striking the inside wall of the holding box, it is necessary to make the gripping device face downward. For this reason, it is not possible to grip a workpiece which is positioned at a corner of the holding box. Furthermore, in the related art, it was not possible to confirm whether the gripping device had indeed gripped a workpiece.

The present invention was made in consideration of such a situation and has as its object the provision of a robot gripping device with a high versatility which can approach a workpiece vertically downward and grip it with a high reliability without regard as to the orientation and shape of the workpiece and without using an expensive servo hand.

SUMMARY OF INVENTION

To achieve the above-mentioned object, according to a first aspect, there is provided a robot gripping device which has two or more finger parts and has front ends of the finger parts move toward a center of grip so as to grip an object to be gripped, each finger part having a finger part body which is comprised of a plate-shaped elastic member, a first anti-slip part which is provided at an inside surface of a front end side of the finger part body, and a reinforcing member which is arranged along an outer surface of the finger part body, is connected to the front end of the finger part body, and is higher in rigidity than the finger part body, the reinforcing member having a first rotary joint which makes the reinforcing member pivot about a first axis of rotation which is vertical to a longitudinal direction of the finger part body, and the robot gripping device having a drive part which makes a base end of the finger part body move along the center of grip to make the finger part open and close.

According to a second aspect, there is provided the first aspect wherein the reinforcing member has a second rotary joint which makes the reinforcing member pivot about a second axis of rotation which is parallel to the first axis of rotation and which is between the first rotary joint and the front end of the finger part body.

According to a third aspect, there is provided the first aspect wherein each finger part further has one or more second anti-slip parts at the inside surface of the finger part body.

According to a fourth aspect, there is provided the first aspect wherein the first anti-slip part is formed with a recessed part at its center, the first anti-slip part has a thickness which gradually becomes thinner the closer to an outer circumference part of the first anti-slip part, and the first anti-slip part is an elastic member which is comprised of a polymer compound.

According to a fifth aspect, there is provided the first aspect wherein a gripping surface of the first anti-slip part of one finger part is arranged with respect to a gripping surface of the first anti-slip part of another finger part so that when the finger parts are closed, the front end sides of the finger parts first contact.

According to a sixth aspect, there is provided the second aspect wherein the second rotary joint is provided with a rotation limiting part which prevents rotation by over a predetermined rotational angle.

According to a seventh aspect, there is provided the first aspect wherein the first anti-slip part is provided with a protective member which protects the front end of the finger part body and wherein the protective member sticks out from the first anti-slip part to the front end side of the finger part.

According to an eighth aspect, there is provided the first aspect which is provided with a pushing part which pushes against an outside surface of the finger part body near a base end of the finger part body.

According to a ninth aspect, there is provided the first aspect wherein the first anti-slip part is formed at its gripping surface with a plurality of relief parts, a plurality of projections, or a plurality of groove parts.

According to a 10th aspect, there is provided the fourth aspect wherein the first anti-slip part is formed at its recessed part with an air hole which extends to the outside of the finger part.

According to an 11th aspect, there is provided the first aspect which is provided with an adjusting part which defines and adjusts an interval over which the base end of the finger part body is made to move.

According to a 12th aspect, there is provided the first aspect which is provided with a measuring part which measures a weight of the object.

According to a 13th aspect, there is provided the first aspect which is provided with a grip recognizing part which is provided near the first anti-slip part and which obtains a grasp of the gripped state by being pushed against.

According to a 14th aspect, there is provided the 13th aspect wherein the grip recognizing part which is provided near the first anti-slip part includes a detection device, a detection device pushing part which pushes against the detection device, and a push limiting part which limits the detection device pushing part from pushing against the detection device by a predetermined amount or more.

According to a 15th aspect, there is provided the first aspect which is provided with an object detecting part which detects by a contact method or noncontact method the presence of the object which is gripped by the finger parts.

These and other objects, features, and advantages of the present invention will become clearer from the detailed description of typical embodiments of the present invention which are shown in the attached drawings.

BRIEF DESCRIPTION OF THE DRAWINGS

FIG. 20 is a flow chart which shows the operation of a robot gripping device which is provided with an object detecting part.

DETAILED DESCRIPTION

Below, embodiments of the present invention will be explained with reference to the attached drawings. In the following figures, similar members are assigned similar reference notations. To facilitate understanding, these figures are suitably changed in scale.

Figure 1A:
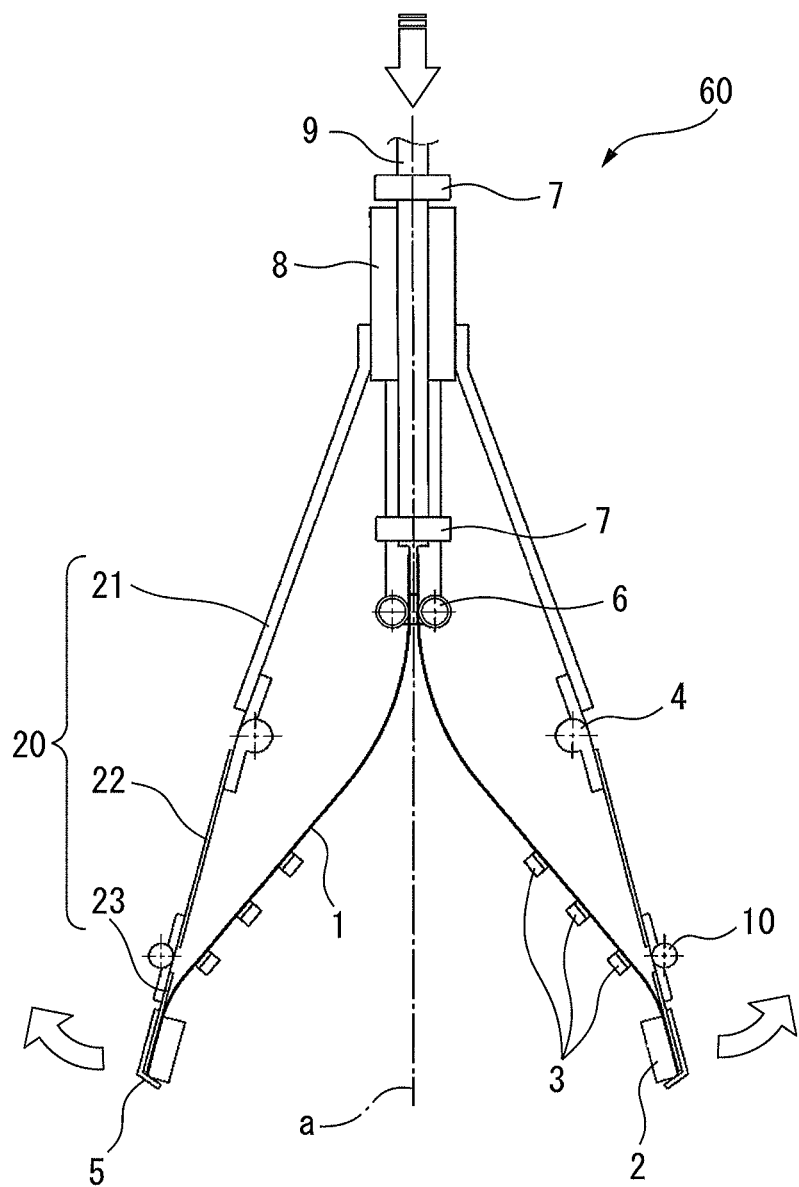
FIG. 1A is a side view which shows an open state of a robot gripping device based on the present invention.
Figure 1B:
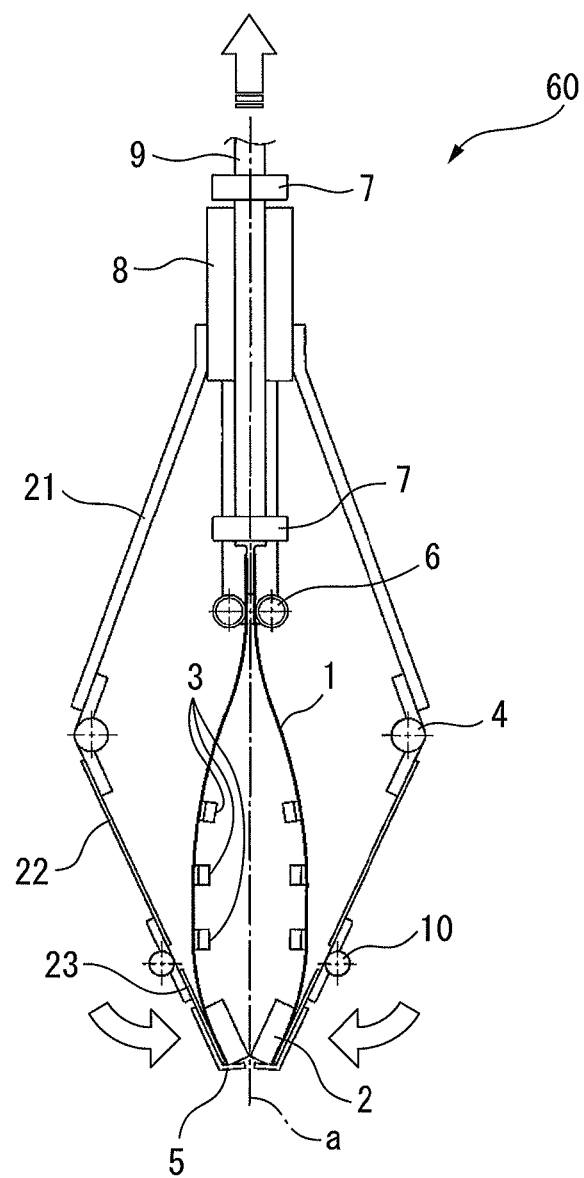
FIG. 1B is a side view which shows a closed state of a robot gripping device based on the present invention.

FIG. 1A and FIG. 1B are side views which show an open state and a closed state of a robot gripping device based on the present invention. The robot gripping device 60 which is shown in these drawings is provided with two finger parts. The finger parts are mainly comprised of a pair of finger part bodies 1 which are comprised of elongated plates and a pair of reinforcing members 20 which are arranged at the outsides of the finger part bodies 1 and which have rigidities which are higher than the finger part bodies 1. Further, in these drawings, a center of grip "a" is shown between the two finger parts.

Each finger part body 1 is preferably made from a spring steel material. However, the finger part body 1 may also be formed from a resin which has rigidity etc. The base ends of the two finger part bodies 1 are connected to the front end of a shaft 9 which can move along the center of grip "a". The shaft 9 is inserted into a through hole of a base part 8 through a linear ball bush. Note that, instead of a linear ball bush, a slide bearing or bearing of a linear drive with a guide rail may be used.

If the shaft 9 moves in the downward direction of FIG. 1A, the finger part bodies 1 of the two finger parts bend outward and separate from each other. Due to this, the robot gripping device 60 opens. Further, if the shaft 9 moves in the opposite direction, the finger part bodies 1 of the two finger parts bend inward whereby the robot gripping device 60 closes (see FIG. 1B).

Figure 2:
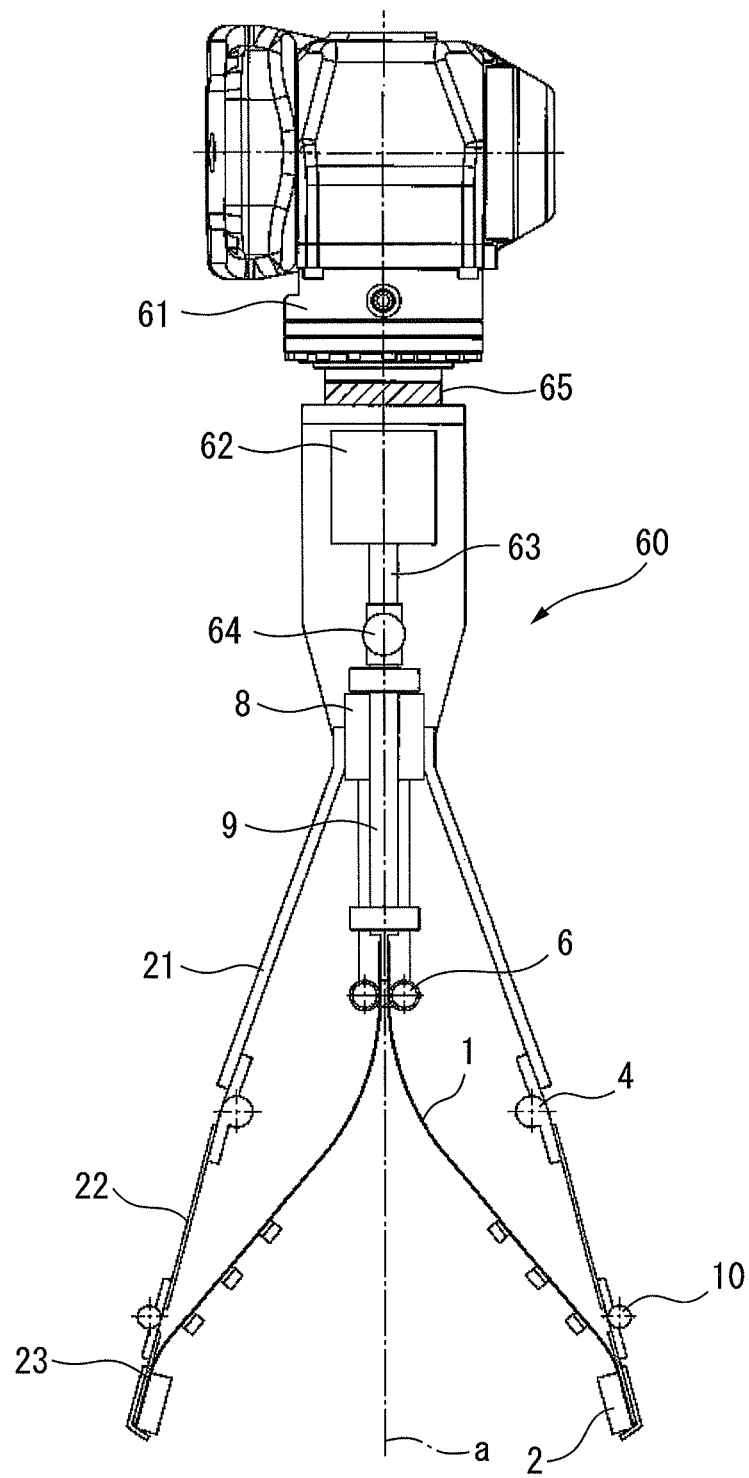
FIG. 2 is a side view of a robot gripping device based on the present invention.

FIG. 2 is a side view of a robot gripping device based on the present invention. As shown in FIG. 2, the robot gripping device 60 is attached to a front end part 61 of a robot (not shown). The robot gripping device 60 is provided with an air cylinder 62, as an actuator, which is coupled to the base part 8. Further, to prevent an eccentric load from acting on an output shaft 63 of the air cylinder 62, the output shaft 63 is connected to the shaft 9 through a universal coupling 64.

Note that, instead of an air cylinder 62, a hydraulic cylinder may be used as the actuator. Alternatively, the shaft 9 can be made from a ball screw or rack/pinion and driven by a servo motor (not shown). Further, the finger part bodies 1 have flexibility, so the finger part bodies 1 may also be reeled up by the actuator. In this case, it is possible to shorten the axial direction length of the base part 8.

Referring again to FIG. 1A etc., two adjusting parts 7 are attached to the shaft 9 along the axial direction of the shaft 9. The shaft 9 can move only between the two adjusting parts 7. In other words, the adjusting parts 7 perform the role of restricting and adjusting the stroke of the shaft 9 and as a result adjusting the amount of opening and closing of the finger parts.

As shown in FIG. 1A etc., at the outsides of the finger part bodies 1 which are positioned at the opposite sides from the center of grip "a", reinforcing members 20 are arranged. Each reinforcing member 20 includes a first reinforcing part 21, second reinforcing part 22, and third reinforcing part 23. These reinforcing parts 21 to 23 are elongated plates. These reinforcing parts 21 to 23 are formed from a material with rigidity high enough so that they do not bend even when the finger part body 1 bends.

As can be seen from the figures, the base end of each first reinforcing part 21 is attached to the outer circumferential surface of the base part 8 of the robot gripping device 60. The distal end of the first reinforcing part 21 is connected through a first rotary joint 4 to a base end of the second reinforcing part 22. The reinforcing parts 21 and 22 of the reinforcing member 20 pivot about the first rotary joint 4 whereby the reinforcing member 20 flexes and extends.

Further, the distal end of each second reinforcing part 22 is connected through a second rotary joint 10 to a base end of the third reinforcing part 23. Furthermore, the distal end of each third reinforcing part 23 is connected to a front end of a finger part body 1. Further, as illustrated, at the inside of the front end of the finger part body 1, a first anti-slip part 2 which is formed from a flexible material is attached.

By such a configuration, if the shaft 9 slides linearly along the center of grip "a", the linear motions of the base ends of the two finger part bodies 1 are converted to rotational motions of the reinforcing members 20 about the first rotary joints 4. When making the second reinforcing parts 22 longer, it is possible to make the opening distance between the front ends of the two finger parts greater and, as a result, possible to raise the opening and closing efficiency of the finger parts.

Figure 3A:
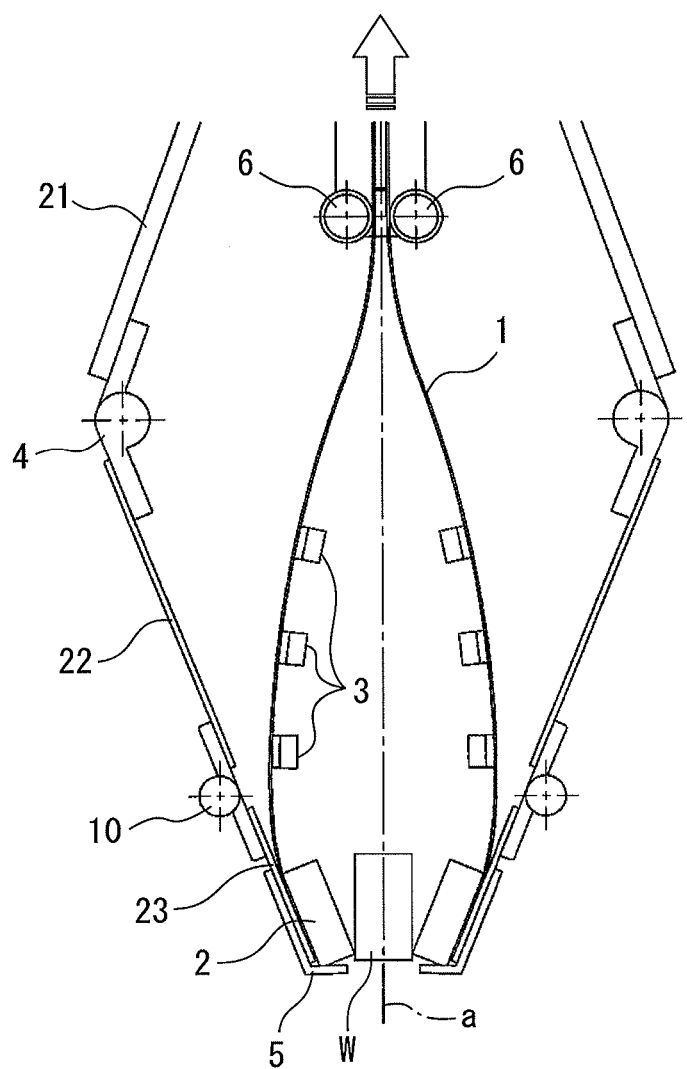
FIG. 3A is a first partial enlarged view of when the robot gripping device grips a workpiece.
Figure 3B:
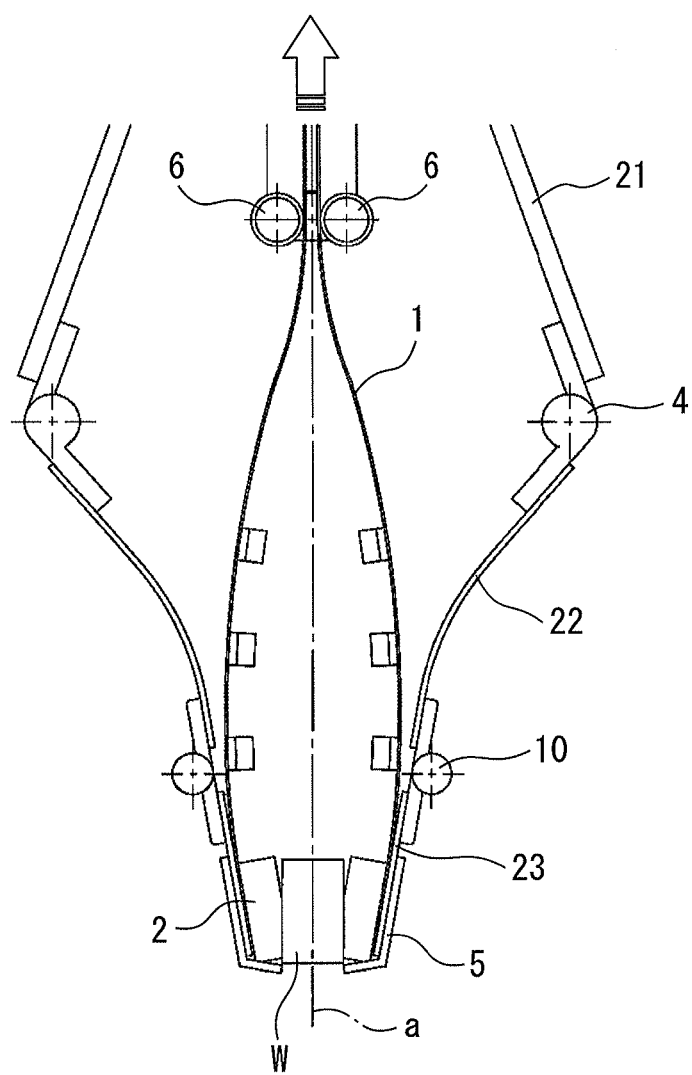
FIG. 3B is a second partial enlarged view of when the robot gripping device grips a workpiece.

In this regard, FIG. 3A and FIG. 3B are first and second partial enlarged views of when the robot gripping device grips a workpiece. In these figures, it is assumed that a rectangular parallelepiped-shaped workpiece W is placed at the center of grip "a". The rigidity of the first reinforcing parts 21 in FIG. 3A and FIG. 3B is greater than the rigidity of the second reinforcing parts 22. Alternatively, the thickness of the first reinforcing parts 21 in FIG. 3A and FIG. 3B may be made greater than the thickness of the second reinforcing parts 22.

FIG. 3A shows the instant when the finger part bodies 1 bend and contact a workpiece W when making the shaft 9 rise. At this time, the second reinforcing parts 22 do not deform much at all. Only the parts of the first anti-slip parts 2 near the front ends contact the workpiece W. Further, if continuing to make the shaft 9 rise, as shown in FIG. 3B, the middle parts of the second reinforcing parts 22 bend inward. For this reason, the majorities of the surfaces of the first anti-slip parts 2 contact the two side surfaces of the workpiece W. In other words, in the configuration which is shown in FIG. 3A and FIG. 3B, the first anti-slip parts 2 follow the side surfaces of the workpiece W and closely contact the side surfaces of the workpiece W. Therefore, In this case, it is possible to raise the "follow" performance.

Figure 4A:
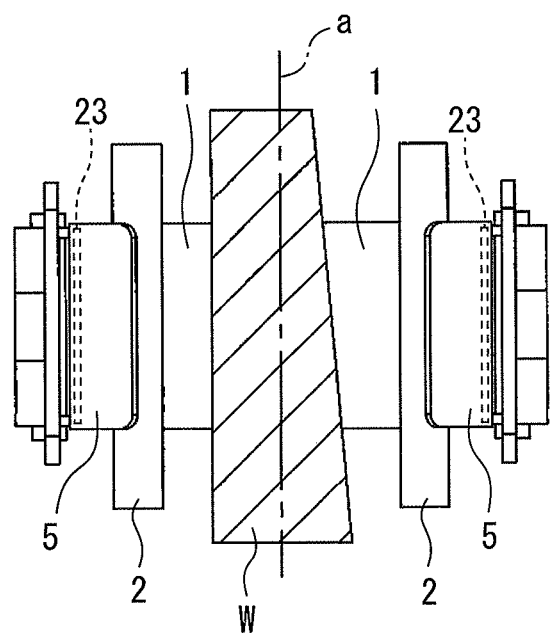
FIG. 4A is a first view of a robot gripping device seen from the front end side.
Figure 4B:
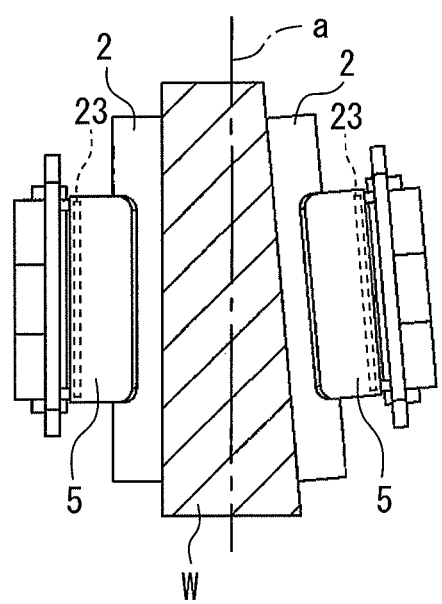
FIG. 4B is a second view of a robot gripping device seen from the front end side.

FIG. 4A and FIG. 4B are views seen from the front end side of the robot gripping device. FIG. 4A shows the state before the finger part bodies 1 grip a workpiece W, while FIG. 4B shows the state after the finger part bodies 1 grip a workpiece W. The workpiece W which is shown in these drawings is a tubular member with a trapezoidal cross-section and is arranged so that the top side and bottom side of its cross-section become vertical to the center of grip "a". Further, the workpiece W is arranged so that one side surface of the workpiece W becomes not parallel to one first anti-slip part 2, while the other side surface of the workpiece W becomes parallel to the other first anti-slip part.

As can be seen from these drawings, when a workpiece W is gripped, the finger part body 1 of one first anti-slip part 2 is twisted. Therefore, the finger part body 1 elastically deforms so that the first anti-slip part 2 follows one side surface of the workpiece W. Due to this, the first anti-slip part 2 closely contacts one side surface of the workpiece W. For this reason, in the present invention, even if one side surface of a workpiece W is not parallel with the first anti-slip part 2, the workpiece W can be reliably gripped.

In this way, in the present invention, finger part bodies 1 which are comprised of plate-shaped elastic members are used, so the robot gripping device 60 can be made simple in structure. As a result, the robot gripping device 60 can be made much lower in price compared with a servo hand. Further, the finger part bodies 1 are high in flexibility and, further, two finger part bodies 1 grip the workpiece W by enveloping it, so workpieces of various shapes which are arranged in various orientations can be stably gripped.

Further, as can be seen from FIG. 1A and FIG. 4A, at the back surface side of each first anti-slip part 2, a distal end of the third reinforcing part 23 is positioned. Further, at the third reinforcing part 23, a protective member 5 which is bent at a predetermined angle is fastened. The protective member 5 is preferably made from a metal plate with a relatively high rigidity. The protective member 5 is arranged so as to cover the first anti-slip part 2 from the outside. The front end of the protective member 5 is positioned further at the front end side of the finger part than the front end of the first anti-slip part 2.

When taking out one of a plurality of workpieces W which are randomly stacked in a holding box etc., the front ends of the finger parts of the robot gripping device 60 have to enter the clearances between relatively hard workpieces W. The first anti-slip parts 2 are formed from a flexible material, so when taking out a workpiece W, the parts of the first anti-slip parts 2 near the front ends will easily strike the workpiece W and be damaged.

Regarding this point, in the present invention, the protective members 5 which are shown in FIG. 4A etc. protect the first anti-slip parts 2 and third reinforcing parts 23. For this reason, the finger parts easily enter the clearances between the workpieces W and between the side surfaces of the holding box which holds the workpieces and the workpieces W. For this reason, even if a workpiece W is positioned at a corner of the holding box etc., the workpiece W is easily gripped. Further, when the finger parts are made to enter the clearances between workpieces W and when the front ends of the finger parts strike the bottom surface of the holding box which holds the workpieces, it is possible to prevent the front ends of the finger parts from being damaged. In particular, the protective members 5 which are illustrated are bent at a predetermined angle, so the front ends of the finger parts, for example, the front ends of the first anti-slip parts 2, can be reliably protected.

As can be seen from referring to FIG. 1A and FIG. 4 again, the protective members 5 preferably do not stick out from the gripping surfaces of the first anti-slip parts 2 to the center of grip "a" side. The reason is that when a workpiece W is thin in thickness or when a workpiece W is elongated in shape, before the workpiece W contacts the gripping surfaces of the first anti-slip parts 2, the two protective members 5 might contact each other. When the protective members 5 do not stick out from the gripping surfaces of the first anti-slip parts 2 to the center of grip "a" side, the first anti-slip parts 2 can be reliably made to first contact the workpiece W.

Further, as shown in FIG. 1A, at the inside surfaces of the finger part bodies 1, pluralities of second anti-slip parts 3 are attached. A single finger part body 1 may also have a single second anti-slip part 3 attached as well. At the surface of each second anti-slip part 3, a large number of relief parts are formed, so the frictional coefficient of the surface is relatively large. For this reason, even if the workpiece W has lubrication oil, working oil, etc. deposited on it, when the workpiece W is gripped, the workpiece W is prevented from slipping off from between the finger parts. Note that instead of the relief parts, a plurality of projections or a plurality of grooves may be formed on the surface of each second anti-slip part 3. Alternatively, the inside surface of each finger part body 1 may have relief shapes or grooves directly formed on it, so the finger part body 1 and the second anti-slip part 3 may be integrally formed. Due to this, a workpiece W can be pushed in and reliably gripped.

In FIG. 1A, pushing members 6 are attached near the base ends of the finger part bodies 1. The pushing members 6 push the finger part bodies 1 toward the center of grip "a" so that the finger part bodies 1 do not bulge out in directions away from the center of grip "a".

In a certain embodiment, the pushing members 6 are cam followers. When using cam followers as pushing members 6, the pushing members 6 come into rolling contact with the finger part bodies 1. Therefore, the finger part bodies 1 can be reduced in wear. Furthermore, if increasing the diameters of the pushing members 6, the radii of curvature at the base ends of the finger part bodies 1 can be increased. As a result, the stress which acts on the finger part bodies 1 is reduced and even if repeatedly making the finger part bodies 1 bend, the fatigue life of the finger part bodies 1 can be extended.

Figure 5A:
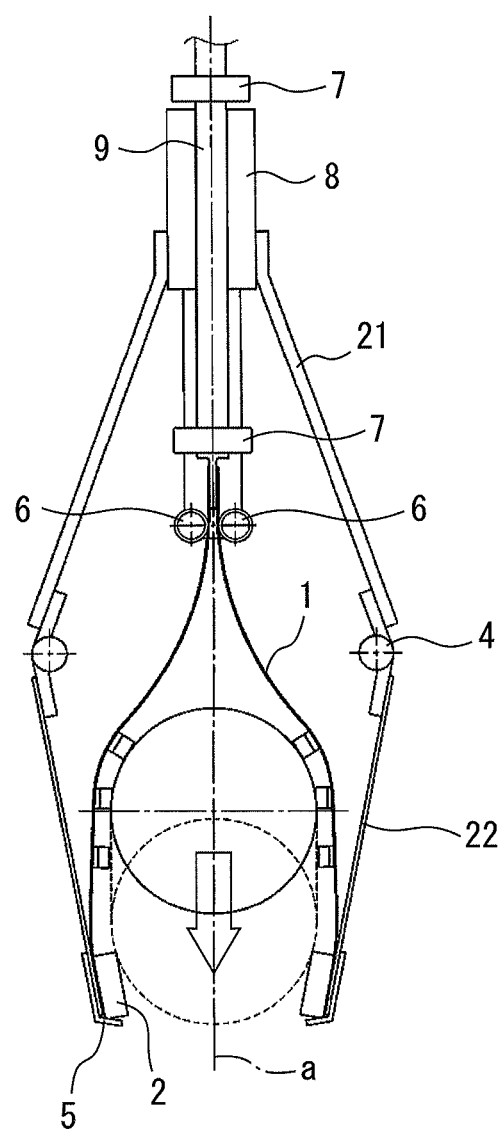
FIG. 5A is a partial enlarged view of when a robot gripping device which is not provided with a second rotary joint grips a workpiece.

FIG. 5A is a partial enlarged view of when a robot gripping device grips a workpiece. In FIG. 5A, the second rotary joints 10 are not provided, so there are also no third reinforcing parts 23. Instead, the second reinforcing parts 22 are extended by exactly the amounts of the third reinforcing parts 23. Further, in FIG. 5A, a relatively large cylindrically shaped workpiece W is gripped.

As shown in FIG. 5A, when the workpiece W is gripped, the two finger part bodies 1 bend so as to follow the outer shape of the workpiece W. At this time, the pluralities of second anti-slip parts 3 closely contact the upper outer surface of the workpiece W. Furthermore, the above-mentioned pushing members 6 prevent the vicinities of the base ends of the finger part bodies 1 from bending to the outside. Therefore, in the present invention, a relatively large cylindrically shaped workpiece W can be firmly gripped.

However, in FIG. 5A, the second rotary joints 10 are not provided, so the front ends of the finger parts which are positioned farther from the workpiece W when seen from the pushing members 6 are open. For this reason, there is a possibility of the workpiece W slipping off from the front ends of the finger parts.

Figure 5B:
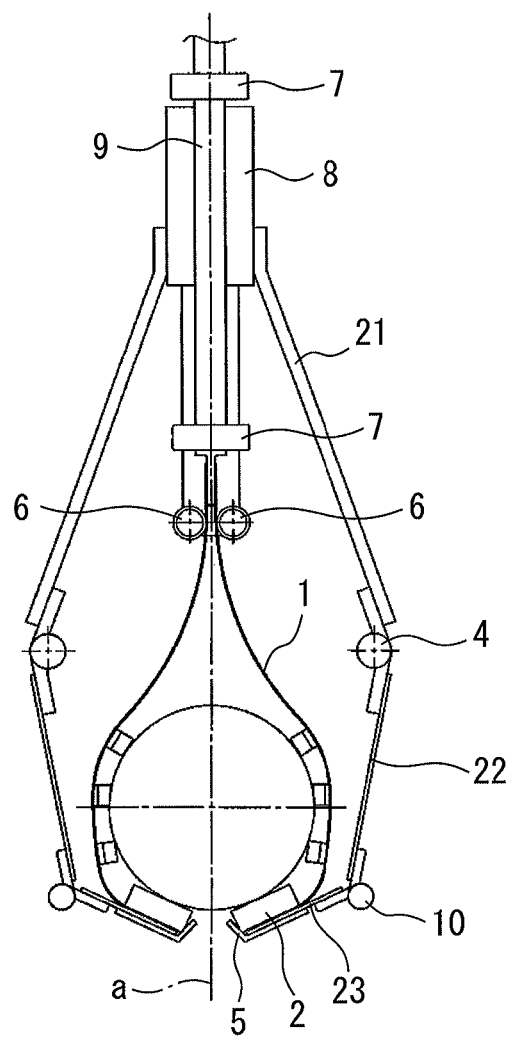
FIG. 5B is a partial enlarged view of when a robot gripping device which is provided with a second rotary joint grips a workpiece.

As opposed to this, in a partial enlarged view of when a robot gripping device which is provided with the second rotary joints grips the workpiece, that is, FIG. 5B, the third reinforcing parts 23 are coupled with the distal ends of the second reinforcing parts 22 through the second rotary joints 10. In the configuration which is shown in FIG. 5B, the third reinforcing parts 23 pivot further inward about the second rotary joints 10 whereby the first anti-slip parts 2 follow the outer shape of the workpiece W and support the lower part of the workpiece W. As a result, the front ends of the finger parts are closed and it becomes harder for the workpiece W which is gripped to slip off. In other words, it will be understood that the configuration which is shown in FIG. 5B can grip a workpiece W more reliably than even the configuration which is shown in FIG. 5A.

A simplified robot hand gripped a workpiece W by just the front ends of the finger parts, so when lifting up a workpiece W or during high speed movement after being gripped, the workpiece W often slipped off. However, in the present invention, the third reinforcing parts 23 close, so the workpiece W can be firmly surrounded and gripped near the centers of the finger parts. Therefore, even when lifting up a workpiece W or during high speed movement after being gripped, the workpiece W will almost never slip off.

Figure 6A:
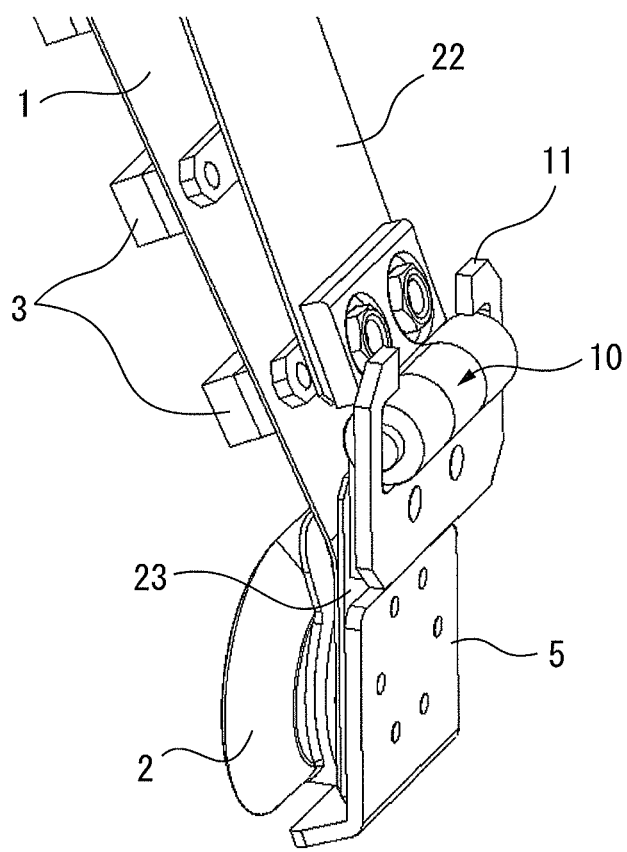
FIG. 6A is a first perspective view which shows a front end of a robot gripping device.
Figure 6B:
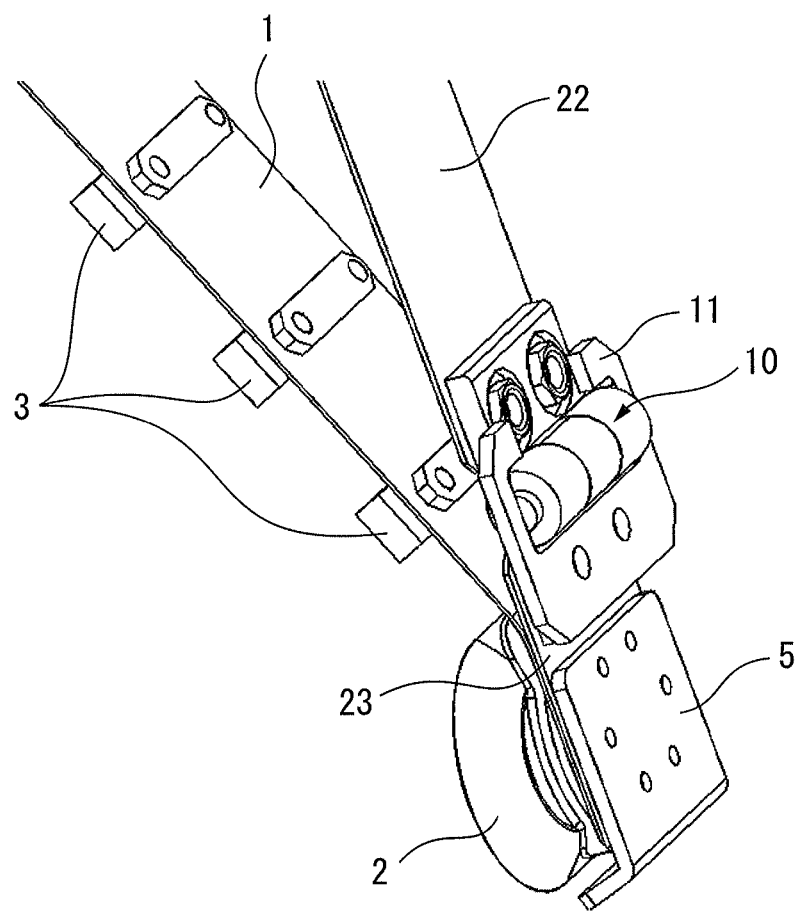
FIG. 6B is a second perspective view which shows a front end of a robot gripping device.

FIG. 6A and FIG. 6B are perspective views which show a front end of a robot gripping device. As shown in these drawings, a second rotary joint 10 includes a rotation limiting part 11 which prevents a third reinforcing part 23 from pivoting by over a predetermined rotational angle. Specifically, the rotation limiting part 11 is a projection which partially overlaps the outer surface of the second reinforcing part 22. Due to the rotation limiting part 11, the front end part of the finger part, which corresponds to the third reinforcing part 23, is kept from opening outward.

Usually, force acts so that the finger part body 1 extends straight, so the rotation limiting part 11 is constantly working. Further, when a workpiece W is gripped, the front end part of the finger part rotates toward the center of grip "a". In other words, the third reinforcing part 23 rotates inward about the second rotary joint 10. As a result, as shown in FIG. 6A, the front end part of the finger part surrounds the workpiece W and the workpiece W can be reliably gripped.

Further, in the state where the robot gripping device 60 is gripping a workpiece W, if the front end parts of the finger parts strike the bottom surface of the holding box or a workpiece other than the workpiece W to be gripped, there is a possibility that the third reinforcing parts 23 will pivot about the second rotary joints 10 to separate from the center of grip "a". However, in the present invention, there are the rotation limiting parts 11, so the third reinforcing parts 23 pivot toward the center of grip "a". In other words, in the present invention, since there are the rotation limiting parts 11, two finger parts will never completely open. Therefore, a workpiece W can be prevented from slipping off from the robot gripping device 60.

As explained above, the robot gripping device 60 of the present invention has a "follow" function which uses the flexibility of the finger part bodies 1, a closing function of the front end parts of the finger parts which uses the second rotary joints 10, and a reliable gripping function which uses the first anti-slip parts 2 and second anti-slip parts 3. Therefore, the robot gripping device 60 can secure a large number of contact parts with the workpiece W. For this reason, by just making the robot gripping device 60 move in the vertical direction downward, a workpiece W can be reliably gripped without regard as to the orientation of the workpiece W.

Figure 7A:
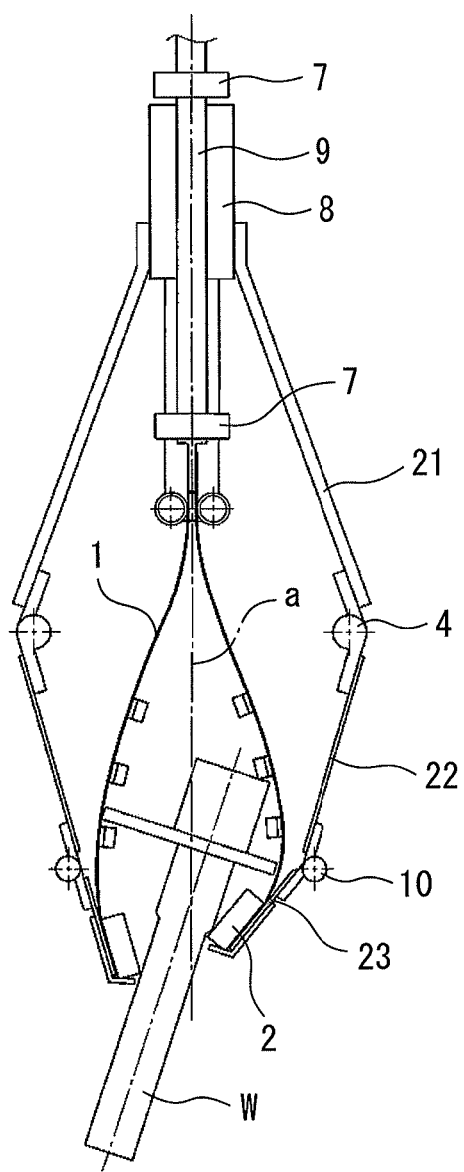
FIG. 7A is a first view which shows the robot gripping device gripping a workpiece.
Figure 7B:
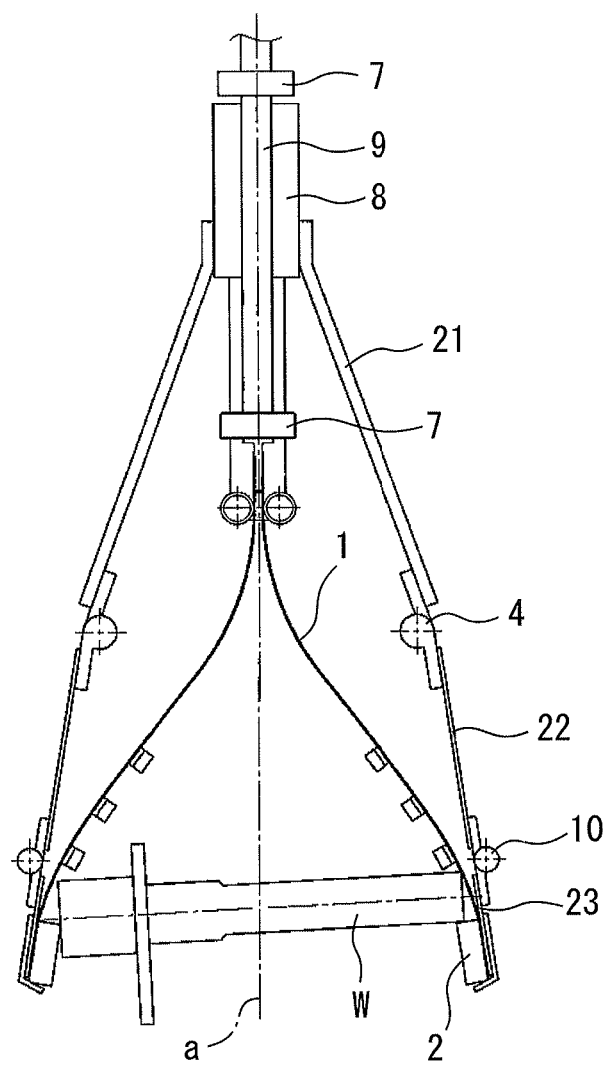
FIG. 7B is a second view which shows the robot gripping device gripping a workpiece.
Figure 7C:
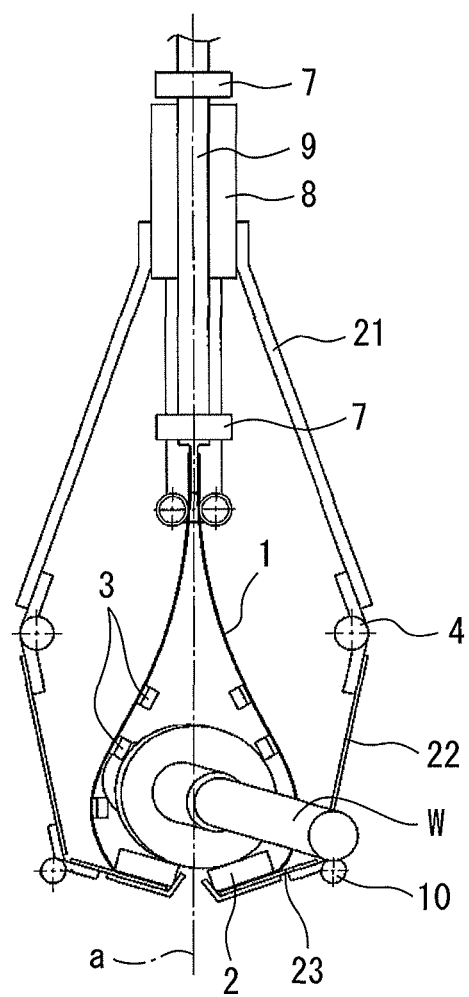
FIG. 7C is a third view which shows the robot gripping device gripping a workpiece.

FIG. 7A to FIG. 7C are views which show a robot gripping device which grips a workpiece. These drawings show, as the workpiece W, a shaft on which a flange is provided. In particular, the flange of the workpiece W which is shown in FIG. 7A is attached eccentrically to the shaft. In other words, the workpiece W which is shown in FIG. 7A is not line symmetric about its center axis.

For this reason, when a workpiece W is arranged so that the center axis of the workpiece W becomes the same as the direction of movement of the shaft 9, it is difficult to grip the workpiece W. However, even in such a case, in the present invention, as shown in FIG. 7A, by having just one third reinforcing part 23 pivot about the second rotary joint 10, one finger part body 1 bends inward more than the other finger part body 1. In other words, in the present invention, the two finger part bodies 1 bend in different manners from each other. Therefore, the finger part bodies 1 can grip a workpiece W so as to follow it and can reliably grip the workpiece W.

Further, when a workpiece W is arranged so that the center axis of the workpiece W is substantially vertical to the center of grip "a", the workpiece W has to be gripped so as to straddle the two ends of the shaft of the workpiece W. In the present invention, even in such a case, as shown in FIG. 7B, both of the two finger part bodies 1 open to the respective maximum open positions. Therefore, an elongated shape workpiece W can be easily gripped.

Furthermore, when a workpiece W is arranged so that the center axis of the workpiece W is included in the center of grip "a" or becomes an acute angle with respect to the center of grip "a", the workpiece W has to be held so as to surround the flange of the workpiece W. In the present invention, even in such a case, as shown in FIG. 7C, the two third reinforcing parts 23 pivot about the respective second rotary joints 10. As a result, the two finger part bodies 1 follow the flange of the workpiece W to surround it, and the two first anti-slip parts 2 support the workpiece W from below. Therefore, the workpiece W can be reliably gripped.

Figure 8A:
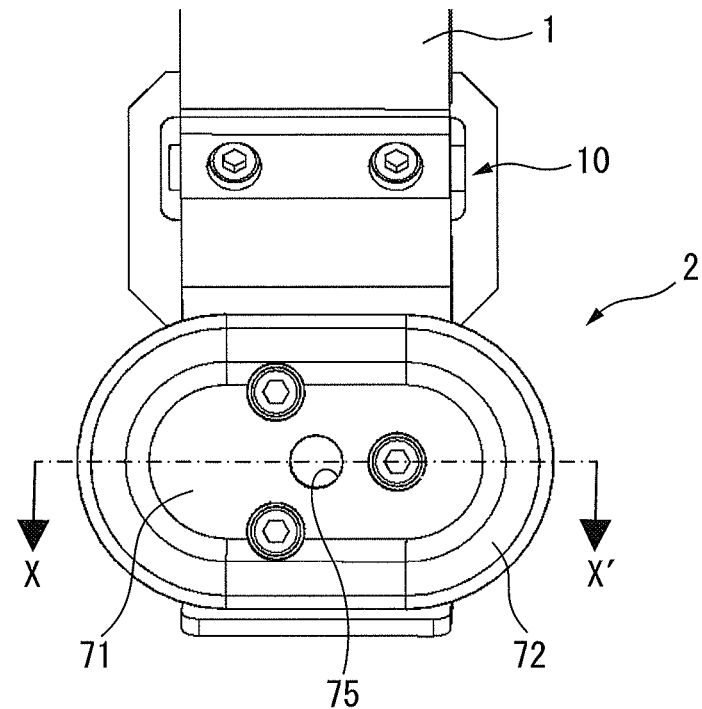
FIG. 8A is a front view of a first anti-slip part.
Figure 8B:
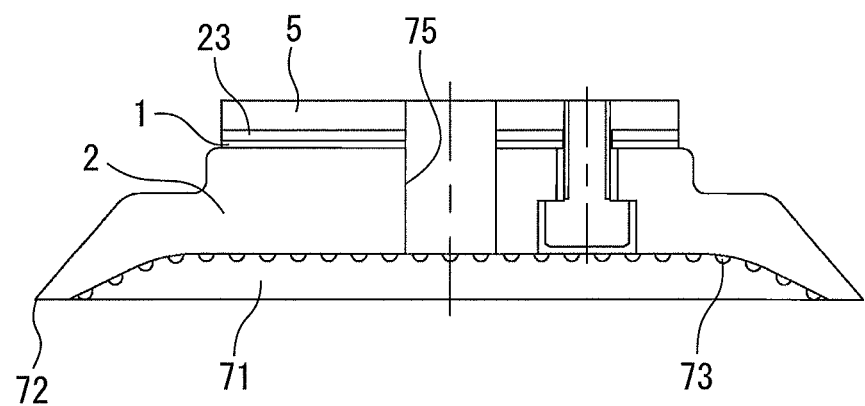
FIG. 8B is a cross-sectional view seen along the line X-X' which is shown in FIG. 8A.

Furthermore, FIG. 8A is a front view of a first anti-slip part, while FIG. 8B is a cross-sectional view which is seen along the line X-X' which is shown in FIG. 8A. As can be seen from these drawings, the first anti-slip part 2 is oval in shape when viewed from the front and is substantially trapezoidal in shape when viewed from the side. The first anti-slip part 2 is an elastic member which is made from a flexible polymer compound.

As can be particularly seen from FIG. 8B, the center part 71 of the first anti-slip part 2 is formed as a recessed part which is recessed more than the outer circumference part 72. This recessed part also has a substantially trapezoidal cross-section. Further, the first anti-slip part 2 becomes thinner in thickness the closer to the outer circumference part 72. Therefore, in the vicinity of the outer circumference part 72, the first anti-slip part 2 easily deforms.

For this reason, even if a workpiece W is complicated in shape, the outer circumference part 72 of the first anti-slip part 2 and the part near it are pushed against the surface of the workpiece W and deform so as to follow the surface of the workpiece W. As a result, a large contact surface area can be obtained and the workpiece W can be reliably gripped. Note that for the purpose of gripping the workpiece W, the first anti-slip part 2 preferably has a high frictional coefficient and has a high flexibility.

As shown in FIG. 8A, the first anti-slip part 2 is arranged so that its longitudinal direction becomes vertical to the longitudinal direction of the finger part body 1. When the robot gripping device 60 grips the vicinity of one end of an elongated workpiece W which is arranged in the horizontal direction by a substantially cantilever manner, a moment due to gravity acts on the workpiece W. Even in such a case, since the first anti-slip part 2 is arranged as explained above, the workpiece W will never slip off from the first anti-slip part 2 and can be relatively stably gripped.

Further, as shown in FIG. 8B, at the recessed part of the first anti-slip part 2 which constitutes the center part 71, a plurality of small sized projections 73 are provided. These projections 73 perform the role of preventing the workpiece W from slipping off even when the workpiece W has lubrication oil etc. deposited on it. Instead of providing the projections 73, the center part 71 may also be formed with a plurality of relief parts or the center part 71 may be formed with a plurality of grooves.

As can be seen from FIG. 8A and FIG. 8B, the back surface of the first anti-slip part 2 is attached to a finger part body 1. Further, the finger part body 1 is connected to a third reinforcing part 23 and a protective member 5. A through hole 75 which is formed at the center part 71 of the first anti-slip part 2 extends through the first anti-slip part 2, finger part body 1, third reinforcing part 23, and protective member 5. In other words, the through hole 75 is communicated with the outside.

When gripping a workpiece W, sometimes part of the workpiece W and part of the first anti-slip part 2 will completely stick to each other and a vacuum part will be formed. In such a case, there would be the possibility that the workpiece W would continue to be held by suction at that first anti-slip part 2. However, in the present invention, the through hole 75 is formed, so such a vacuum part is never formed. Therefore, the workpiece W will not continue to closely stick to part of the first anti-slip part 2 and, when the finger parts of the robot gripping device 60 are opened, the workpiece W will reliably be released from the robot gripping device 60.

As can be seen from FIG. 1A and FIG. 1B etc., the first anti-slip parts 2 are attached to the insides of the front ends of the finger parts. Further, the first anti-slip parts 2 are arranged so as to first contact a workpiece W when the finger parts are closed. For this reason, when the workpiece W is gripped, it becomes hard for the workpiece W to slip off from between the two first anti-slip parts 2. Further, even when the workpiece W is elongated, when it is thin, or when it is extremely small, the front ends of the first anti-slip parts 2 can easily grab the workpiece W. In other words, the robot gripping device 60 of the present invention can handle various shapes of workpieces W and is extremely high in versatility.

Note that, even with the robot gripping device 60 of the present invention, sometimes the workpiece W may fail to be gripped or a plurality of workpieces W will be simultaneously gripped. For this reason, when a workpiece W is gripped, it is desirable to measure its weight and compare the result of measurement with a predetermined value. In such a case, the result of measurement can be used as the basis to easily judge the necessity for again gripping a workpiece W.

Referring again to FIG. 2, a weight sensor 65 is arranged between the base part of the robot gripping device 60 and the wrist front end part 61 of the robot. The weight sensor 65 measures the weight while the robot gripping device 60 is gripping a workpiece W. Further, the value which the weight sensor 65 measures may be reduced by the known weight of the robot gripping device 60 to find a subtracted value. The subtracted value is the weight of the gripped workpiece W. Then, the difference between the subtracted value and the known weight of the workpiece W is found. If the difference is substantially zero, it means a workpiece W is suitably being gripped.

When the difference is minus in sign and the value is substantially the same as the predetermined weight of the workpiece W, it is judged that a workpiece W has failed to be gripped and the device is made to operate to again grip a workpiece W. Furthermore, when the difference is plus in sign and the value is the known weight of one workpiece or more, it can be judged that two or more, that is, a plurality of, workpieces W are simultaneously gripped. In this case, the finger parts are opened to release the workpieces W once. Further, the device is made to operate to again grip a workpiece W. In this way, it will be understood that a configuration which is provided with the weight sensor 65 is advantageous for judging the necessity of again gripping a workpiece.

Figure 9A:
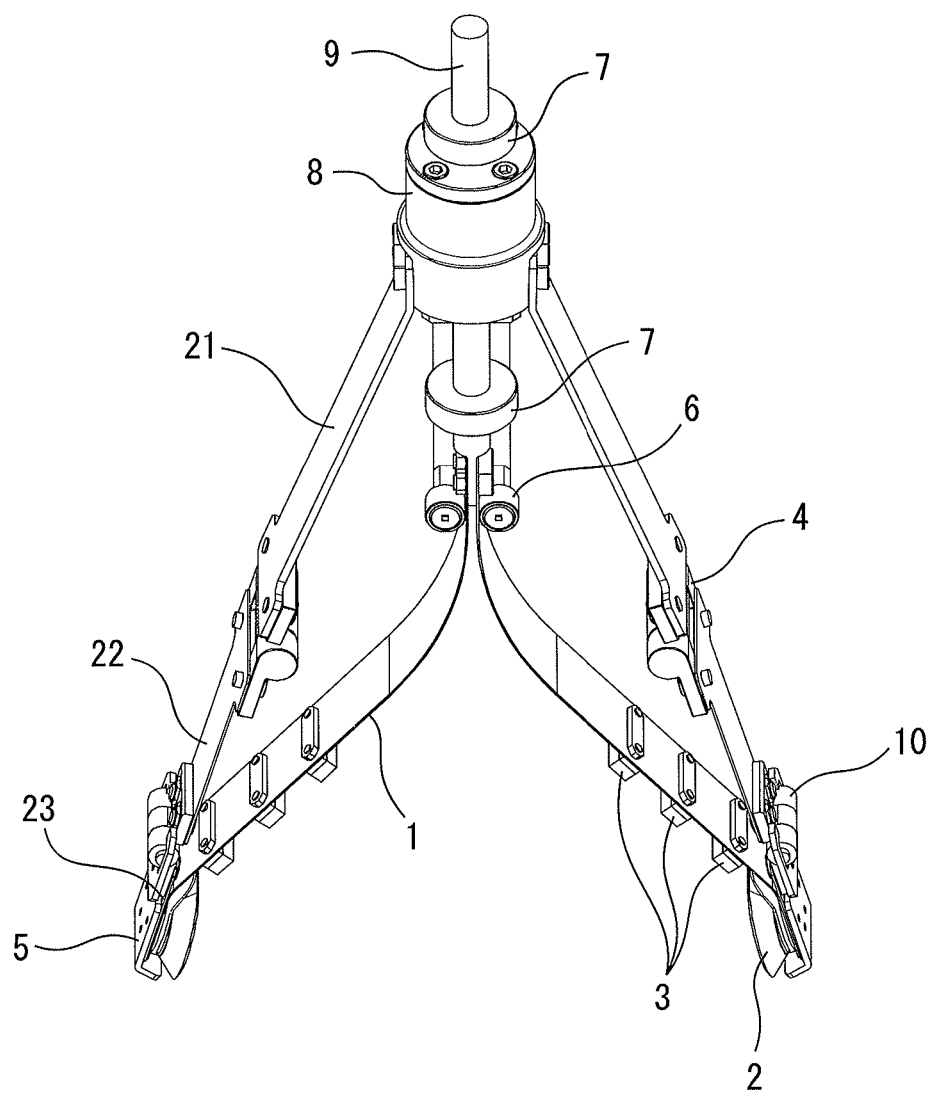
FIG. 9A is a partial perspective view of a robot gripping device which is provided with two finger parts.
Figure 9B:
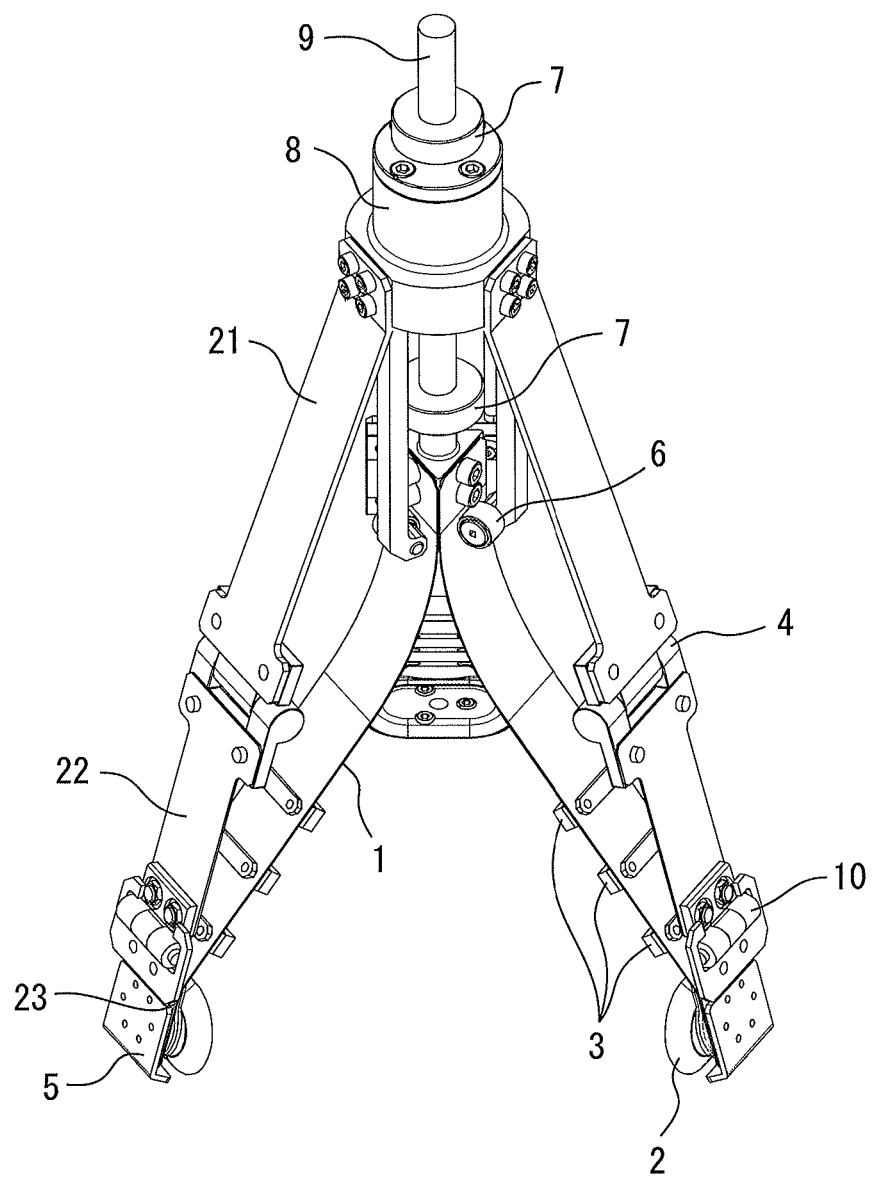
FIG. 9B is a partial perspective view of a robot gripping device which is provided with three finger parts.
Figure 9C:
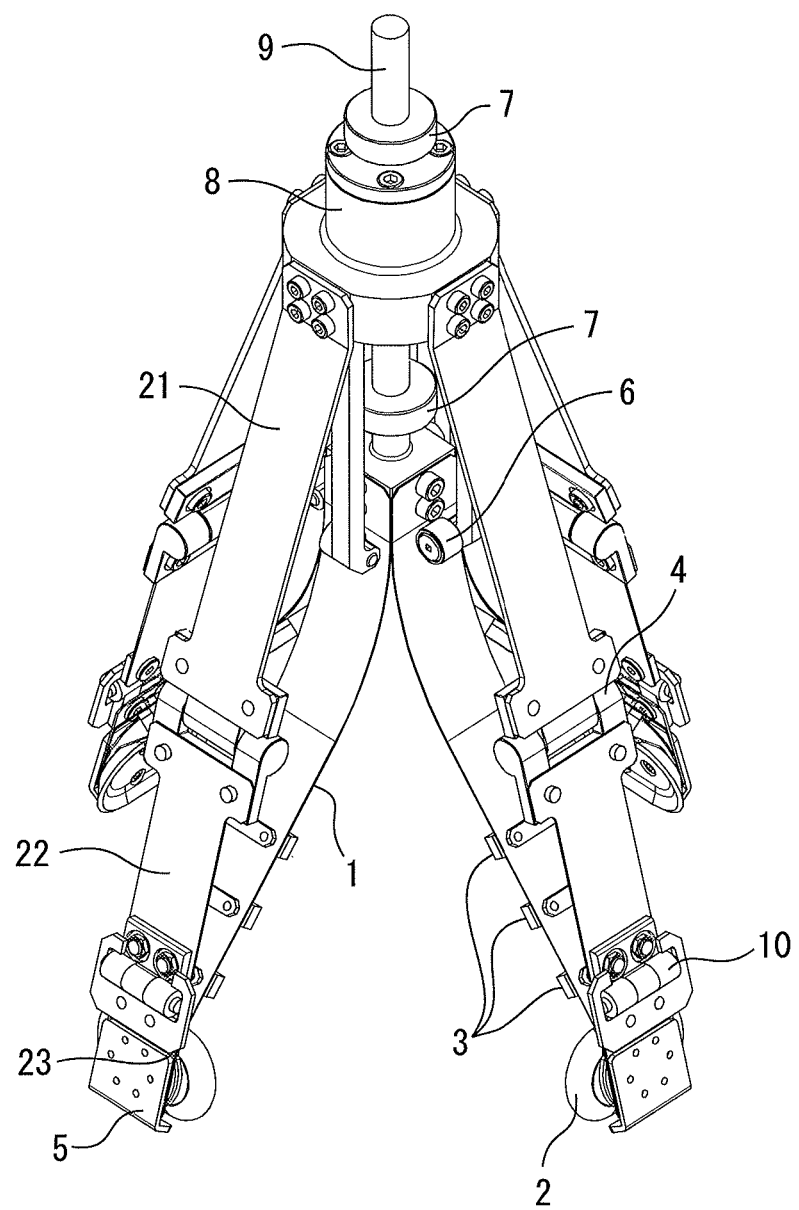
FIG. 9C is a partial perspective view of a robot gripping device which is provided with four finger parts.
Figure 10A:
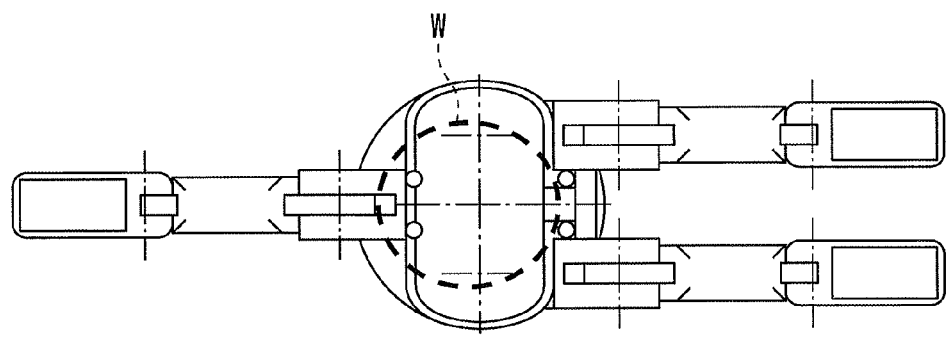
FIG. 10A is a top view of a first hand in the related art.
Figure 10B:
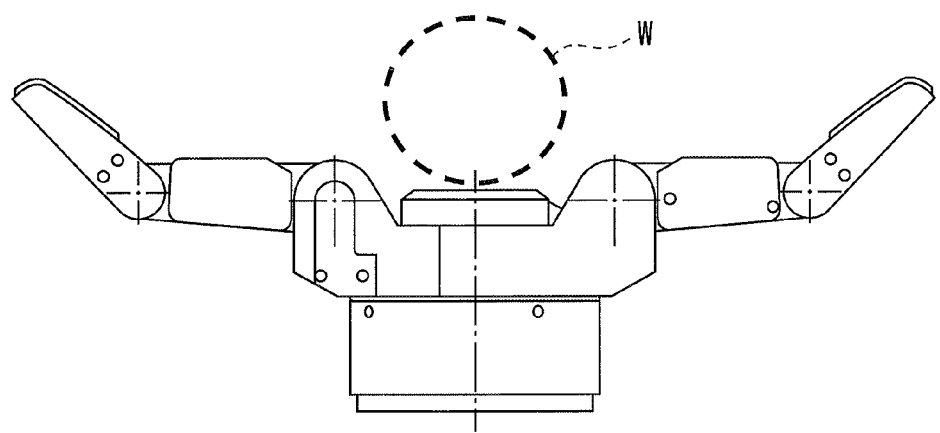
FIG. 10B is a side view of a first hand in the related art.
Figure 11:
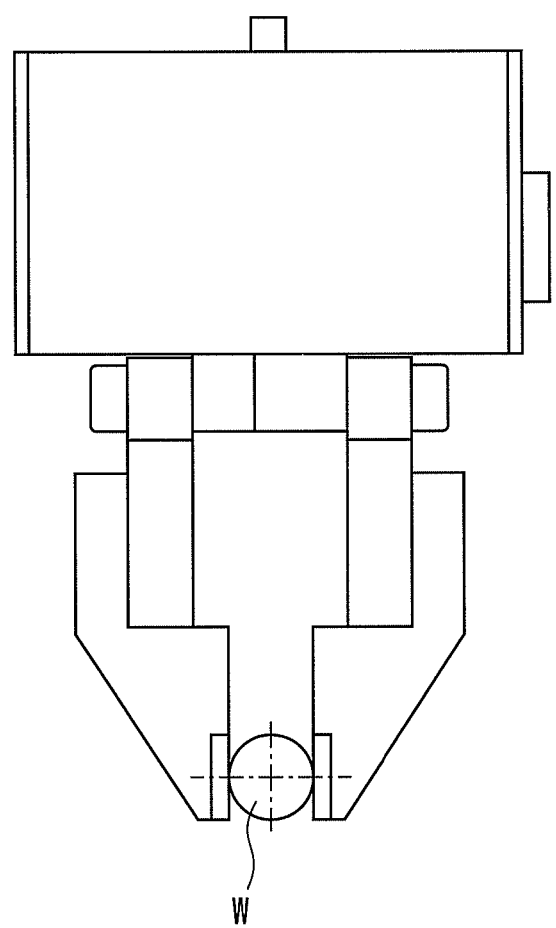
FIG. 11 is a view which shows a second hand in the related art.

FIG. 9A to FIG. 9C are partial perspective views of robot gripping devices which are respectively provided with two finger parts, three finger parts, and four finger parts. As shown in FIG. 9A, in the above-mentioned embodiment, the robot gripping device 60 was explained as one which has two finger parts.

However, the robot gripping device 60, as shown in FIG. 9B, may also be provided with three finger parts or, as shown in FIG. 9C, may also be provided with four finger parts. Note that the case where the robot gripping device 60 has a further larger number of finger parts is also included in the scope of the present invention. The number of finger parts is determined in accordance with the shape of the workpiece W, the application of use of the robot gripping device 60, etc. It will be understood that when changing the number of finger parts in this way, the numbers and arrangements of the base parts 8, shafts 9, pushing members 6, etc. are similarly changed.

Figure 12:
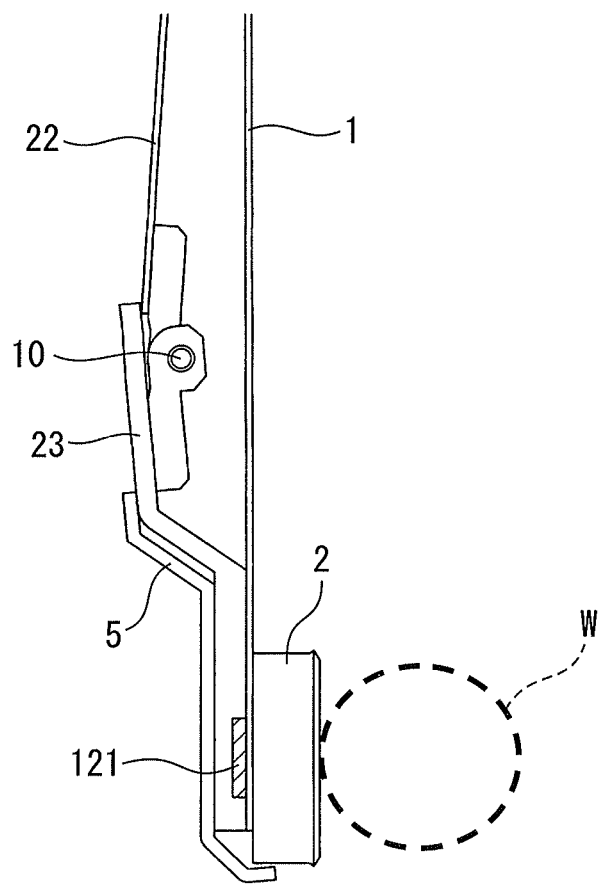
FIG. 12 is a partial enlarged view of a robot gripping device.

FIG. 12 is a partial enlarged view of a robot gripping device. In FIG. 12, a third reinforcing part 23 is bent at two locations so that the front end of the third reinforcing part 23 becomes parallel with a finger part body 1 near the front end of the finger part body 1. Further, a grip recognizing part 121 is embedded near the front end of the third reinforcing part 23 which is parallel to the finger part body 1 and which faces the finger part body 1. The grip recognizing part 121 is a limit switch, proximity switch, pressure sensor, etc. Note that, while not shown in the drawings, the other finger part bodies 1 are similar in configuration. The same is true for the other drawings explained later as well.

When the finger part bodies 1 are closed and a workpiece W is gripped, the pushing force is transmitted through the first anti-slip parts 2 and finger part bodies 1 to the grip recognizing parts 121. For this reason, the grip recognizing parts 121 can confirm that a workpiece W is being gripped. The grip recognizing parts 121 can recognize well that a workpiece W is being gripped no matter what parts of the first anti-slip parts 2 grip the workpiece W.

Figure 13A:
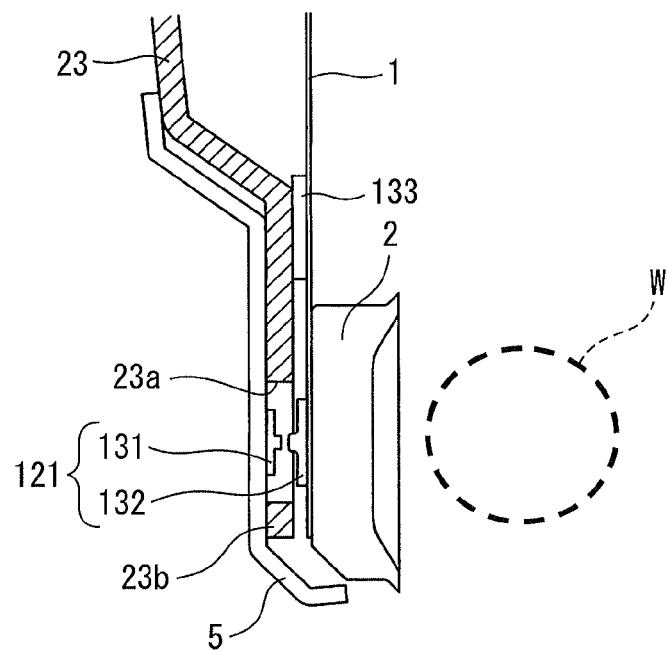
FIG. 13A is a partial enlarged view of a robot gripping device in an open state.
Figure 13B:
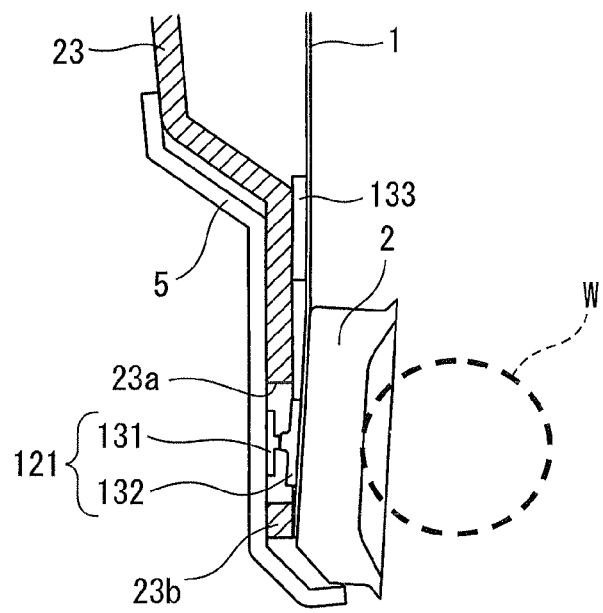
FIG. 13B is a partial enlarged view of a robot gripping device in a gripped state.

FIG. 13A and FIG. 13B are partial enlarged views of a robot gripping device in the open state and gripped state, respectively. The grip recognizing part 121 which is shown in FIG. 13A and FIG. 13B includes a detection device 131 and a detection device pushing part 132 which pushes against the detection device 131. As shown in FIG. 13A and FIG. 13B, the detection device 131 is attached to the inside surface of a protective member 5 at the inside of a hole 23a which is formed in the third reinforcing part 23. The detection device pushing part 132 is attached at the outer surface of the finger part body 1 at a position which corresponds to the detection device 131.

Furthermore, near the bent part of the third reinforcing part 23, a spacer 133 is provided between the third reinforcing part 23 and the finger part body 1. The thickness of the spacer 133 generally corresponds to the thickness of the detection device pushing part 132. For this reason, as can be seen from FIG. 13A, in the open state, a clearance which corresponds to the spacer 133 is formed between the finger part body 1 and the front end portion 23b of the third reinforcing part 23. Further, in FIG. 13A, the detection device 131 is not pushed by the detection device pushing part 132, that is, the two are separated from each other.

As opposed to this, as shown in FIG. 13B, in the state where the workpiece W is gripped, the front end part of the finger part body 1 which is positioned more to the front end side than the spacer 133 elastically deforms outward. As a result, the detection device pushing part 132 which is attached to the outer surface of the finger part body 1 pushes against the detection device 131. Due to this, the grip recognizing part 121 recognizes that a workpiece W has been gripped. Note that, when releasing the grip on the workpiece W, the finger part body 1 is returned to the original state which is shown in FIG. 13A and the detection device pushing part 132 separates from the detection device 131.

In this regard, as can be seen from FIG. 13A and FIG. 13B, the front end part 23b remains between the hole 23a of the third reinforcing part 23 and the front end of the third reinforcing part 23. As shown in FIG. 13B, when the finger part body 1 bends outward, the front end of the finger part body 1 abuts against the front end part 23b of the third reinforcing part 23, so the finger part body 1 never bends outward beyond the front end part 23b.

For this reason, the detection device 131 is never pushed by the detection device pushing part 132 by more than a predetermined amount. Therefore, an extremely large force can be prevented from being applied from the detection device pushing part 132 to the detection device 131 and the detection device 131 can be prevented from being broken. In other words, the front end part 23b of the third reinforcing part 23 performs the role of a push limiting part which limits the detection device pushing part 132 from pushing the detection device 131 by more than a predetermined amount. Therefore, when the grip recognizing part 121 recognizes that a workpiece W has been gripped, it is possible to raise the reliability of this recognition.

In the embodiment which is shown in FIG. 13A and FIG. 13B, the detection device 131 is provided inside of the hole 23a of the third reinforcing part 23, and the detection device pushing part 132 is provided at the rear surface side of the first anti-slip part 2. Therefore, in this case, a grip recognizing part of a pushing structure which utilizes the elastic deformation of the finger part body 1 can be formed. Further, the detection device 131 is arranged at the inside of the hole 23a of the third reinforcing part 23, so even if the grip recognizing part 121 is built into the finger part, the finger part can be prevented from becoming thicker.

Figure 14A:
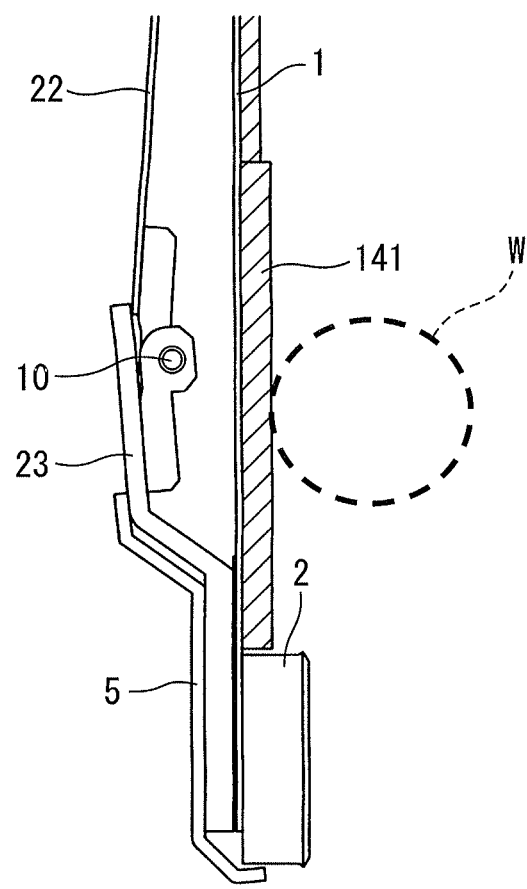
FIG. 14A is another partial enlarged view of a robot gripping device.
Figure 14B:
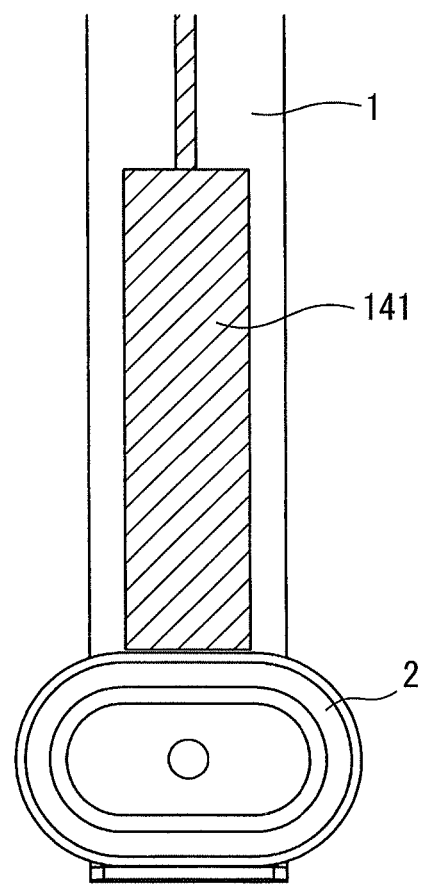
FIG. 14B is a front view of a robot gripping device which is shown in FIG. 14A.

In this regard, FIG. 14A is another partial enlarged view of a robot gripping device, while FIG. 14B is a front view of the robot gripping device which is shown in FIG. 14A. As shown in these drawings, the inside surface of the finger part body 1 above the first anti-slip part 2 is provided with another grip recognizing part 141. As can be seen from the drawings, the other grip recognizing part 141 is a mat-shaped switch, a cord-shaped switch, a pressure sensing sheet, etc. and partially extends from the top end of the first anti-slip part 2 along the finger part body 1. Alternatively, the other grip recognizing part 141 may be a set of a plurality of small-sized limit switches or small-sized pressure switches which are arranged in a planar form.

As shown in FIG. 14A, when the finger part body 1 grips the workpiece W above the first anti-slip part 2, the grip recognizing part 141 is pushed by the workpiece W and therefore the presence of the workpiece W can be detected. No matter which part of the finger part body 1 to which the grip recognizing part 141 is attached is used to grip the workpiece W, the grip recognizing part 141 can recognize well that the workpiece W has been gripped. In the embodiment which is shown in FIG. 14A and FIG. 14B as well, it will be understood that a similar effect to that explained above is obtained.

Figure 15A:
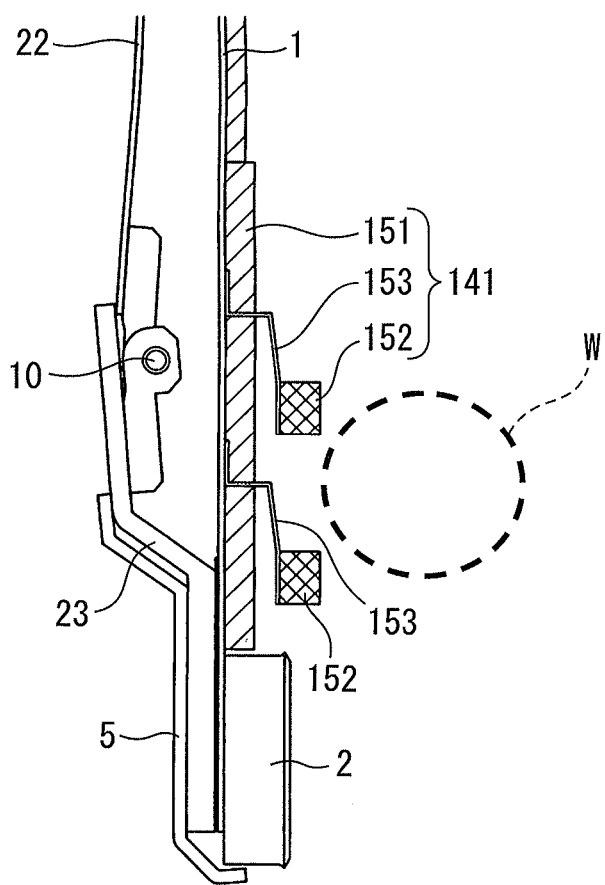
FIG. 15A is a still another partial enlarged view of a robot gripping device.
Figure 15B:
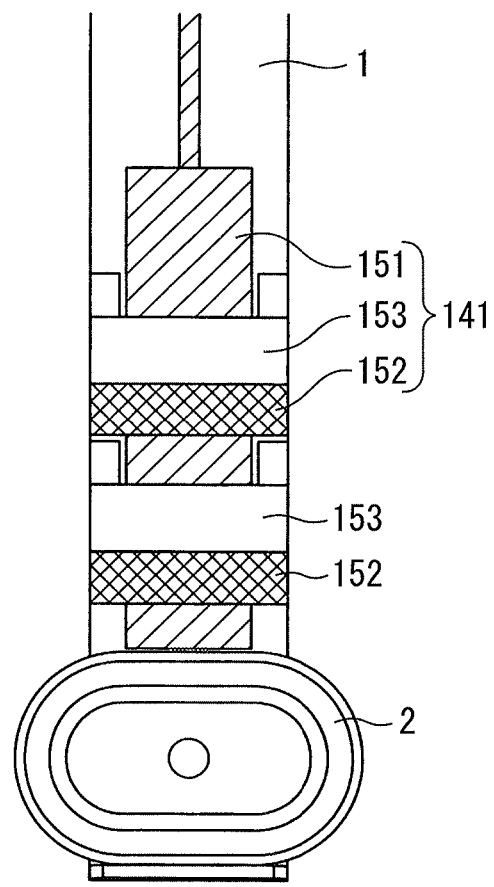
FIG. 15B is a front view of a robot gripping device which is shown in FIG. 15A.

FIG. 15A is still another partial enlarged view of a robot gripping device, while FIG. 15B is a front view of the robot gripping device which is shown in FIG. 15A. As shown in these drawings, at the inside surface of the finger part body 1 above the first anti-slip part 2, a sheet-shaped detection device 151 is provided. Further, a detection device pushing part 152 which pushes against the sheet-shaped detection device 151 is provided at one end of a connection member 153 which has the function of a plate spring. The other end of the connection member 153 is attached to the surface of the finger part body 1. The detection device pushing part 152 performs the role of a second anti-slip part 3. As can be seen from FIG. 15B, these detection device pushing part 152 and the connection member 153 have widths which are substantially equal to the width of the sheet-shaped detection device 151.

In FIG. 15A, due to the connection member 153, the detection device pushing part 152 is separated from the sheet-shaped detection device 151. In other words, when a workpiece W is not being gripped, the connection member 153 keeps the detection device pushing part 152 from pushing against the sheet-shaped detection device 151. Further, as illustrated, a plurality of detection device pushing parts 152 and connection members 153 are preferably provided successively along the length of the finger part body 1.

Figure 15C:
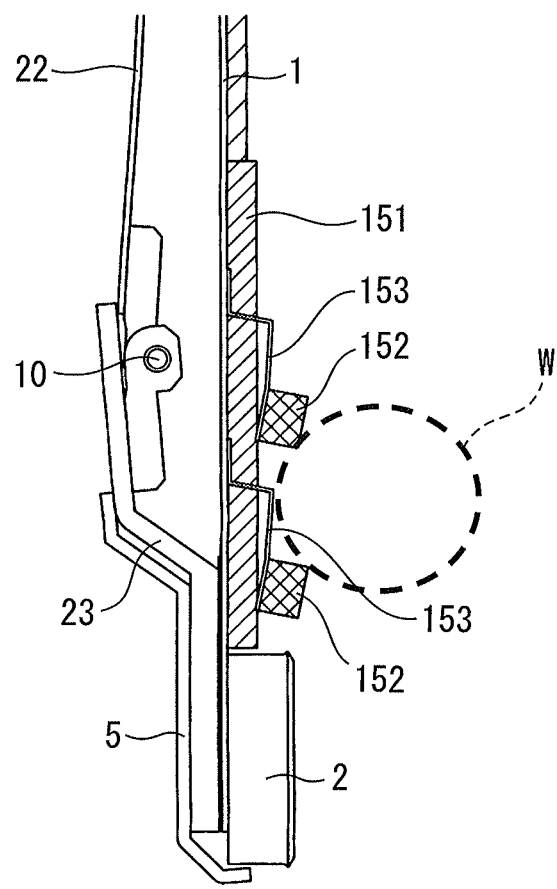
FIG. 15C is a still another partial enlarged view of a robot gripping device in a gripped state.

FIG. 15C is still another partial enlarged view of a robot gripping device in a gripped state. As shown in FIG. 15C, if the finger part body 1 which is positioned above the first anti-slip part 2 grips the workpiece W, the detection device pushing part 152 is pushed by the workpiece W, and the connection member 153 elastically deforms. Finally, the bottom surface of the connection member 153 can push against the sheet-shaped detection device 151 and it is possible to detect the presence of a workpiece W. Note that, when releasing the grip of a workpiece W, the connection member 153 returns to the original state which is shown in FIG. 15A and the detection device pushing part 152 and the connection member 153 separate from the detection device 151. It will be understood that in the embodiment which is shown from FIG. 15A to FIG. 15C as well, advantageous effects which are similar to those which are explained above can be obtained.

Figure 16:
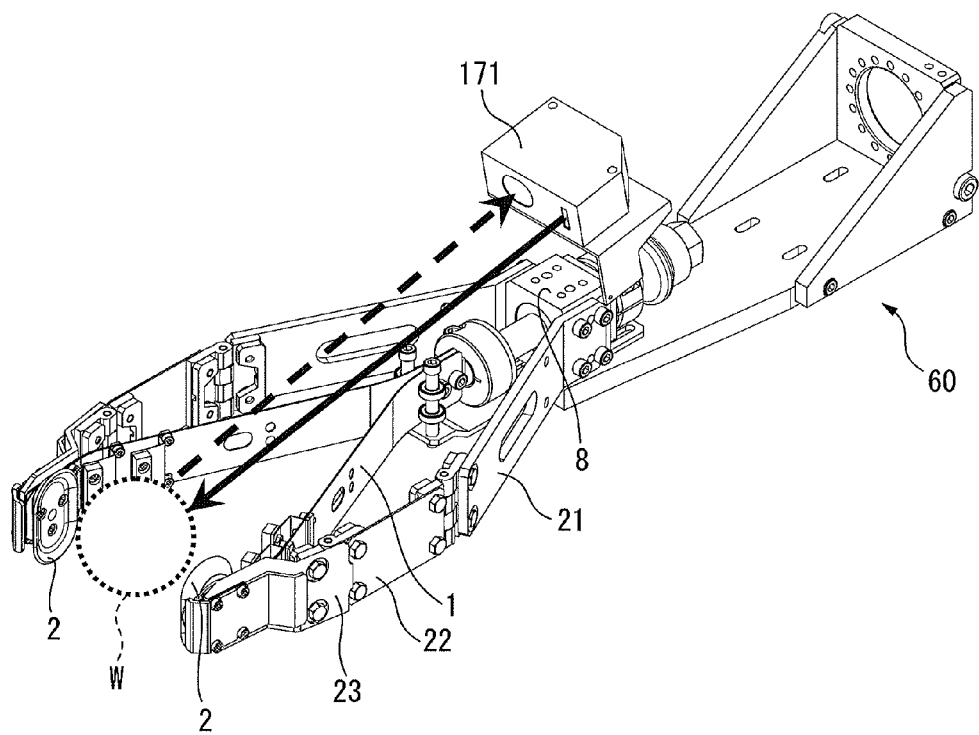
FIG. 16 is a perspective view of a robot gripping device which is provided with a non-contact type object detecting part.

FIG. 16 is a perspective view of a robot gripping device which is provided with a noncontact type object detecting part. In FIG. 16, a photovoltaic switch 171 is attached to the base part 8 of the robot gripping device 60. The photovoltaic switch 171 is provided so that the projected laser beam strikes the center part between two first anti-slip parts 2. When a workpiece W is gripped between two first anti-slip parts 2, the projected laser beam is reflected by the workpiece W and the reflected light is received as a received laser beam at the photovoltaic switch 171. Therefore, the photovoltaic switch 171 can recognize that a workpiece W is being held.

Figure 17:
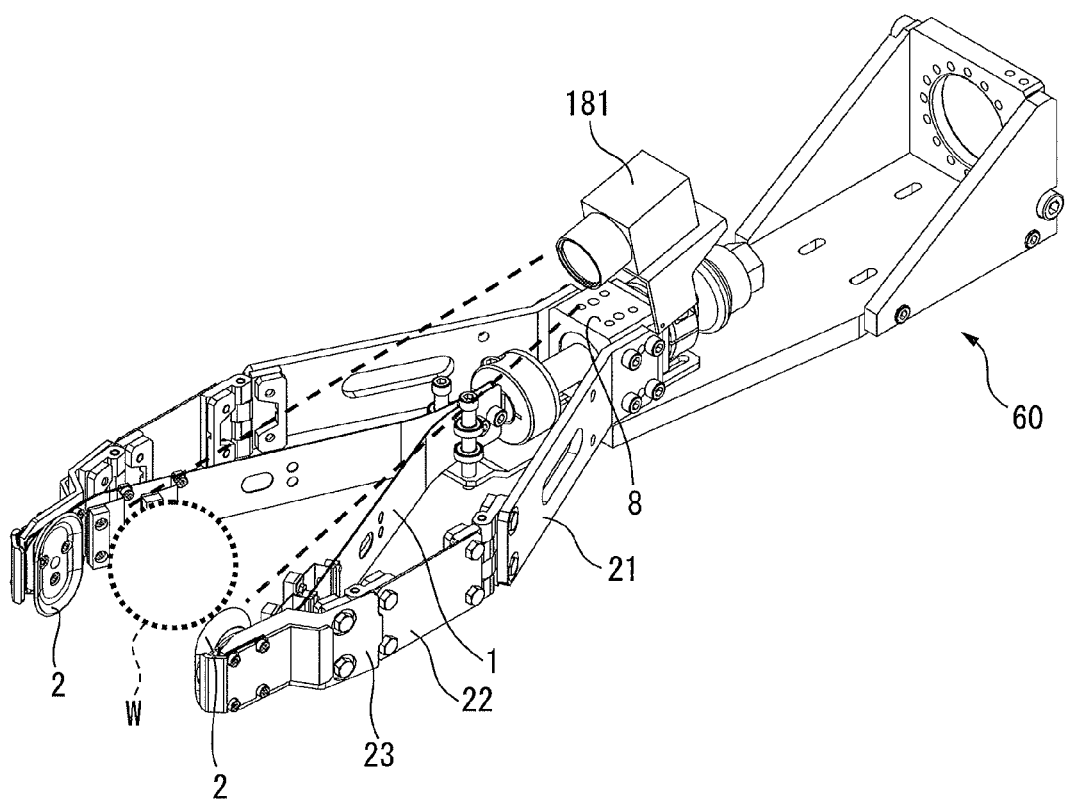
FIG. 17 is a perspective view of another robot gripping device which is provided with a non-contact type object detecting part.

Further, FIG. 17 is a perspective view of a robot gripping device which is provided with another noncontact type object detecting part. In FIG. 17, instead of the photovoltaic switch 171, a camera 181 is similarly attached to the base part 8 of the robot gripping device 60. The camera 181 captures the region between two first anti-slip parts 2 at predetermined time intervals. Further, when an image which differs from the image in the initial state where no workpiece W is present is obtained, it can be confirmed that the workpiece W is being gripped.

Figure 18:
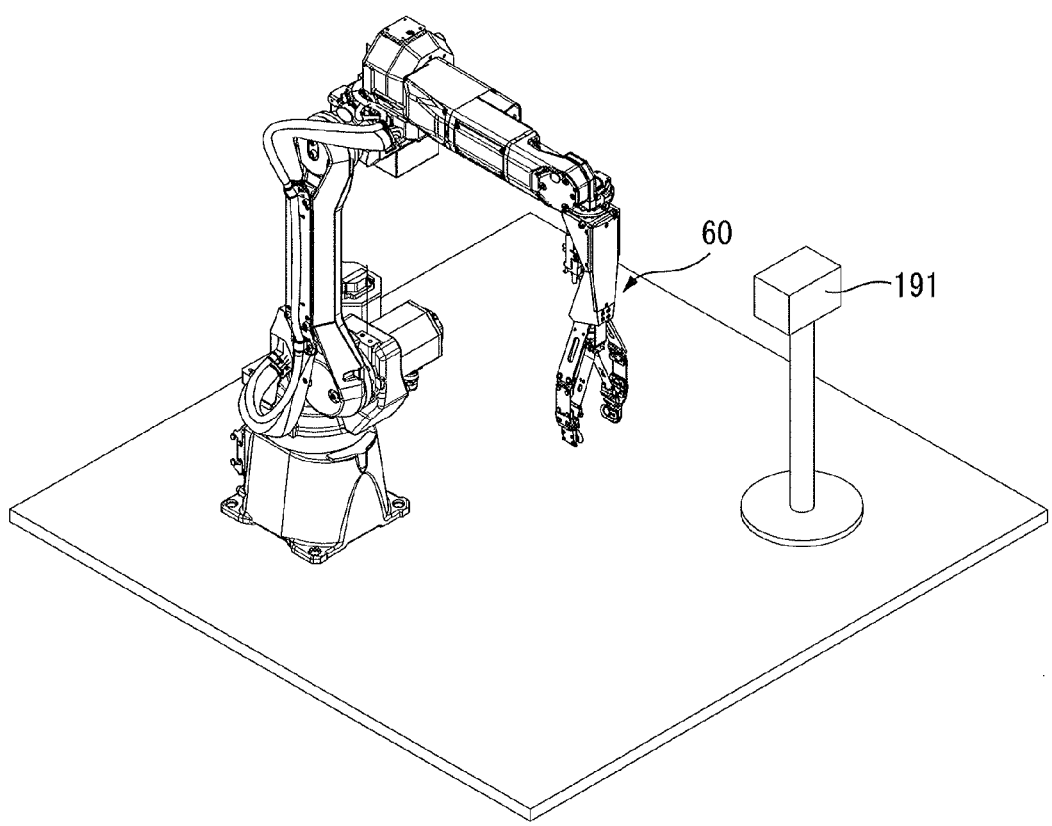
FIG. 18 is a perspective view of a robot gripping device where a non-contact type object detecting part is provided at the outside.

Further, FIG. 18 is a perspective view of a robot gripping device which is provided with a noncontact type object detecting part at the outside. In FIG. 18, the camera 191 is attached to the table surface which extends from the floor part. The camera 191 similarly can capture the region between the two first anti-slip parts 2 of the robot gripping device 60. Further, the camera 191 is assumed to be connected to a controller (not shown) of the robot.

After the robot gripping device 60 of the robot grips a workpiece W, then the robot assumes a certain posture, the camera 191 together captures the two first anti-slip parts 2 of the robot gripping device 60 and a workpiece W between them. Further, when an image which differs from the image in the initial state where no workpiece W is present is obtained, it can be confirmed that the workpiece W is being gripped. Note that, the camera 191 does not have to be attached to the table extending from the floor part. The camera 191 may also be arranged at a location other than the robot gripping device 60 and robot.

These photovoltaic switch 171 and cameras 181 and 191 are noncontact type object detecting parts which detect that an object W is being gripped. Further, instead of the camera 191, a photovoltaic switch or a proximity switch can be employed. By providing a noncontact type object detecting part at a location further from the fingertips of the robot gripping device 60 in this way, a higher degree of detection can be performed.

Figure 19:
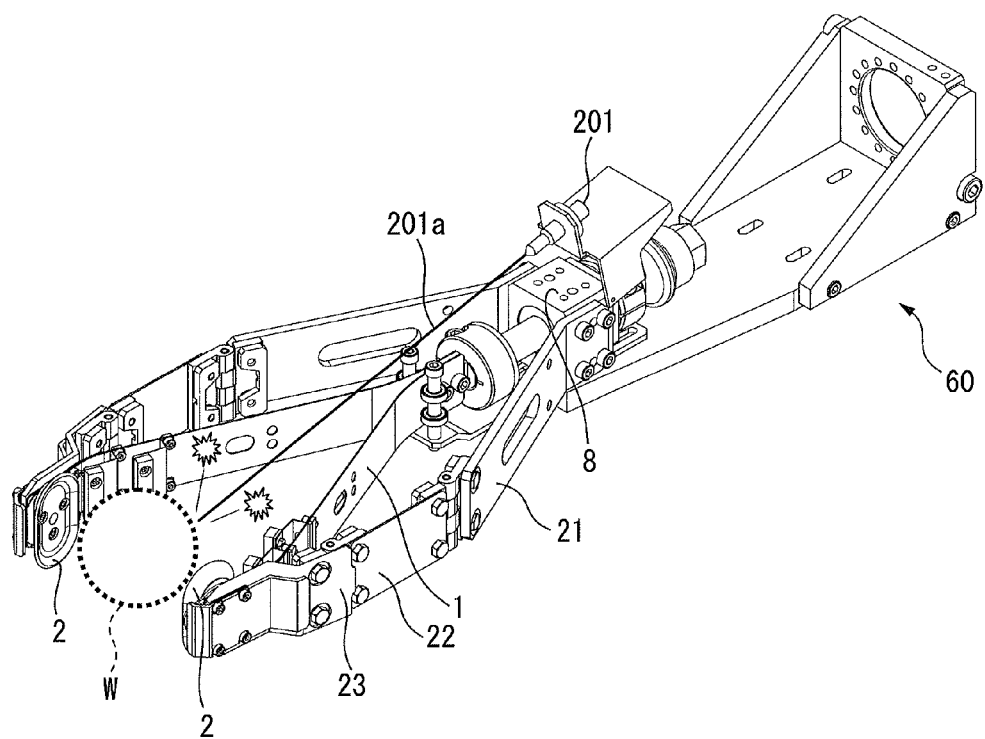
FIG. 19 is a perspective view of a robot gripping device which is provided with a contact type object detecting part.

Furthermore, FIG. 19 is a perspective view of a robot gripping device which is provided with a contact type object detecting part. In FIG. 19, instead of a photovoltaic switch 171, a tactile switch 201 is similarly attached to the base part 8 of the robot gripping device 60. As illustrated, the tactile switch 201 has an elongated rod 201a. Its front end is positioned near the region between the two first anti-slip parts 2.

When an object W is gripped between two first anti-slip parts 2, the front end of the rod 201a contacts the object W, so a workpiece W can be confirmed to be being gripped. For this reason, the tactile switch 201 is a contact type object detecting part which detects that an object W is being gripped. When, in this way, employing a contact type object detecting part which directly contacts a workpiece W, it is possible to detect an object with further higher precision. Note that, instead of the camera 191 which is shown in FIG. 18, a tactile switch 201 may be attached to the table which extends from the floor part. Further, such a contact type or non-contact type object detecting part is also effective for differentiating among different types of workpieces W which have no differences in weight by means other than measurement of weight.

FIG. 20 is a flow chart which shows the operation of a robot gripping device which is provided with a object detecting part. In FIG. 20, as object detecting part, grip recognizing parts 121, 141, a photovoltaic switch 171, cameras 181 and 191, and a tactile switch 201 are used.

First, the robot is made to move to a location for taking out a workpiece W. Further, in FIG. 20, at step S11, a robot controller (not shown) outputs a gripping instruction (finger closing instruction) for the robot gripping device 60 to grip a workpiece W. Due to this, the robot gripping device 60 performs an operation to take out a workpiece W from a takeout location and grip it, Then, at step S12, the object detecting part confirms whether the workpiece W is in a gripped state.

When it is judged that a workpiece W is being gripped, the routine proceeds to step S13 where an instruction is output for conveyance to a destination location. If the workpiece W is conveyed to the destination location, at step S14, a robot controller (not shown) outputs a release instruction (finger opening instruction) for the robot gripping device 60 to release the workpiece W. If the workpiece W is released, at step S15, it outputs a return instruction for making the robot return to the workpiece takeout location.

In this regard, when it is judged at step S12 that a workpiece W is not gripped, the routine returns to step S11 where a workpiece W is again gripped. As explained above, in the present invention, an operation is performed to confirm the gripped state as shown at step S12. Further, if the gripped state is not suitable, the routine quickly returns back to step S11 where the object is again gripped.

In the prior art, the series of operations which are shown in step S13 to step S15 of FIG. 20 might end up being performed in a state where no workpiece W was being gripped. However, in the present invention, an operation is performed to confirm the gripped state at step S12, so the series of operations which are shown from step S13 to step S15 is always performed in a state where a workpiece W is gripped. For this reason, in the present invention, there is no need to perform the useless operation of moving to a target location in a state not gripping a workpiece W, and as a result, the cycle time can be shortened.

Advantageous Effects of Invention

In the first aspect, the linear motion of the base end of a finger part body is converted to rotational motion of a reinforcing member about the first rotary joint. For this reason, it is possible to obtain a certain gripping force using the first rotary joint as a support point without regard as to the degree of opening of the finger parts and as a result it is possible to stably grip a workpiece (object to be gripped). Further, the finger part bodies follow the outer shape of the workpiece and grip the workpiece while enveloping it, so the possibility of the workpiece slipping off is small. Linear drive operation by a drive part is converted to rotational motion about the first rotary joint, so even if the stroke of the drive part is relatively small, the finger parts can be made to open wide and the efficiency of opening and closing the finger parts can be raised. Furthermore, the gripping device becomes simpler in structure, so lighter weight and cost reduction can be achieved as well. Furthermore, it becomes harder for the reinforcing members which are arranged at the outsides of the finger body parts to bend, so the reinforcing members are prevented from bulging outside at the time of gripping and the reinforcing members will never strike the surroundings.

In the second aspect, the second rotary joint is provided, so the ability to follow the outer shape of a workpiece is improved. When a workpiece is gripped, the front ends of the finger parts close to the inside. Therefore, it becomes harder for the workpiece to slip off. Further, even if the front ends of the finger parts hit a hard member, for example, the bottom surface of the holding box, the finger parts pivot inward about the second rotary joint, so impact when hitting something can be avoided and the finger parts can be kept from being damaged.

In the third aspect, the second anti-slip part is provided, so when a workpiece is held between the inside surfaces of the finger part bodies, it becomes harder for the workpiece to slip off and a reliable gripped state can be obtained.

In the fourth aspect, the outer circumference part of the first anti-slip part can more easily deform and the gripping surface of the first anti-slip part can more easily follow complicated shapes of workpieces. For this reason, a large contact surface area is obtained between the first anti-slip part and the workpiece and it becomes harder for the workpiece to slip off.

In the fifth aspect, even if a workpiece is elongated, is thin, or is extremely small, the workpiece can be held and the versatility can be raised.

In the sixth aspect, the second rotary joint is provided with a rotation limiting part, so the front end of a finger part does not open outward. For this reason, a workpiece can be further prevented from slipping off.

In the seventh aspect, the front end of a finger part easily enters the clearance between a workpiece and a holding box. Furthermore, even if the front end of a finger part hits the bottom surface of a holding box etc., the first anti-slip part can be prevented from being damaged.

In the eighth aspect, the finger part body is kept from bending outward and the gripping force is increased.

In the ninth aspect, it becomes harder for a workpiece to slip off even if the workpiece has lubricating oil, working oil, etc. attached to it.

In the 10th aspect, an air hole which communicates with the atmosphere is formed, so a vacuum part can be avoided from forming between the workpiece and the surface of a gripping part. For this reason, when opening the finger parts to release a workpiece, the workpiece can be reliably made to separate from a first anti-slip part.

In the 11th aspect, the amount of opening and closing of the finger parts can be freely adjusted.

In the 12th aspect, failure to grab a workpiece or taking up several workpieces is judged based on weight. Therefore, this is advantageous when again gripping a workpiece.

In the 13th aspect, no matter which parts of the first anti-slip parts or inside surfaces of the finger part bodies grip an object, it is possible to discern well that an object is being gripped. Such a judgment can be immediately performed when gripping and lifting up the object. Therefore, when failing to grip an object, it is possible to immediately retry the operation. Therefore, the average cycle time can be shortened.

In the 14th aspect, the detection device can be provided inside of the reinforcing member which is positioned at the back surface of the first anti-slip part and the detection device pushing part can be provided at the reverse surface side of the first anti-slip part. In this case, it is possible to form a grip recognizing part of a push structure which utilizes the elastic deformation of a finger part body. Further, even if the grip recognizing part is built into the finger part, the finger part can be prevented from becoming thicker. Furthermore, since there is a push limiting part, the detection device can be prevented from being pushed against more strongly than necessary and the reliability can be improved.

In the 15th aspect, the object detecting part is provided at a location away from the fingertip, so a higher degree of detection is possible. If employing a contact type object detecting part which directly contacts an object, a further higher degree of detection is possible.

Typical embodiments were used to explain the present invention, but a person skilled in the art would understand that the above-mentioned changes and various other changes, deletions, and additions may be made without departing from the scope of the present invention.

What is claimed is:

1. A robot gripping device which has two or more finger parts and has front ends of the finger parts move toward a center of grip so as to grip an object, said device comprising:
    each said finger part having a finger part body which is comprised of a plate-shaped elastic member, a first anti-slip part which is provided at an inside surface of a front end side of said finger part body, and a reinforcing member which is arranged along an outer surface of said finger part body, is connected to the front end said of said finger part body, and is higher in rigidity than said finger part body,
    the finger part body of each said finger part is opposed with each other toward the center of grip,
    said reinforcing member having a first rotary joint which makes said reinforcing member pivot about a first axis of rotation which is vertical to a longitudinal direction of said finger part body and which is parallel with a surface of the finger part body of each said finger part, and
    said robot gripping device having a drive part which makes a base end of said finger part body move along said center of grip to make said finger part open and close;
    wherein if the drive part moves a proximal end of the finger part body of each said finger part in the downward direction along the center of grip, the finger part body of each said finger part bends outwardly to separate with each other, so that the finger parts open, and
    wherein if the drive part moves the proximal end of the finger part body of each said finger part in the upward direction along the center of grip, the finger part body of each said finger part bends inwardly, so that the finger parts close.

2. The robot gripping device according to claim 1, wherein said reinforcing member has a second rotary joint which makes said reinforcing member pivot about a second axis of rotation which is parallel to said first axis of rotation and which is between said first rotary joint and the front end of said finger part body.

3. The robot gripping device according to claim 2, wherein said second rotary joint is provided with a rotation limiting part which prevents rotation opening outwardly by over a predetermined rotational angle.

4. The robot gripping device according to claim 1, wherein each said finger part further has one or more second anti-slip parts at the inside surface of said finger part body.

5. The robot gripping device according to claim 1, wherein said first anti-slip part is formed with a recessed part at its center, said first anti-slip part has a thickness which gradually becomes thinner the closer to an outer circumference part of said first anti-slip part, and said first anti-slip part is an elastic member which is comprised of a polymer compound.

6. The robot gripping device according to claim 5, wherein said first anti-slip part is formed at its recessed part with an air hole which extends to the outside of said finger part.

7. The robot gripping device according to claim 1, wherein a gripping surface of the first anti-slip part of one finger part is arranged with respect to a gripping surface of the first anti-slip part of another finger part so that when the finger parts are closed, the front end sides of the finger parts first contact.

8. The robot gripping device according to claim 1, wherein said first anti-slip part is provided with a protective member which protects the front end of said finger part body and wherein said protective member sticks out from said first anti-slip part to the front end side of said finger part.

9. The robot gripping device according to claim 1, which is provided with a pushing part which pushes against an outside surface of said finger part body near a base end of said finger part body.

10. The robot gripping device according to claim 1, wherein said first anti-slip part is formed at its gripping surface with a plurality of relief parts, a plurality of projections, or a plurality of groove parts.

11. The robot gripping device according to claim 1, which is provided with an adjusting part which defines and adjusts an interval over which the base end of said finger part body is made to move.

12. The robot gripping device according to claim 1, which is provided with a measuring part which measures a weight of said object.

13. The robot gripping device according to claim 1, which is provided with a grip recognizing part which is provided near said first anti-slip part and which obtains a grasp of the gripped state by being pushed against.

14. The robot gripping device according to claim 13, wherein said grip recognizing part which is provided near said first anti-slip part includes a detection device, a detection device pushing part which pushes against said detection device, and a push limiting part which limits said detection device pushing part from pushing against said detection device by a predetermined amount or more.

15. The robot gripping device according to claim 1, which is provided with an object detecting part which detects by a contact method or noncontact method the presence of the object which is gripped by said finger parts.

* * * * *